United States Patent
Takagi et al.

[11] Patent Number: 5,940,024
[45] Date of Patent: Aug. 17, 1999

[54] ONBOARD RADAR SYSTEM FOR A VEHICLE

[75] Inventors: Makoto Takagi, Suntou-gun; Setsuo Tokoro, Susono, both of Japan

[73] Assignee: Toyota Jidosha Kabushiki Kaisha, Toyota, Japan

[21] Appl. No.: 08/988,407

[22] Filed: Dec. 10, 1997

[30] Foreign Application Priority Data

Dec. 11, 1996 [JP] Japan ................................. 8-331051

[51] Int. Cl.⁶ ........................... G01S 13/93; G01S 13/34
[52] U.S. Cl. ........................ 342/70; 342/128; 342/109
[58] Field of Search ........................ 342/70, 128, 130, 342/112, 114, 109

[56] References Cited

U.S. PATENT DOCUMENTS 5,619,208  4/1997  Tamatsu et al. ........................ 342/70
5,652,589  7/1997  Ono et al. ........................ 342/70
5,751,240  5/1998  Fujita et al. ........................ 342/70

FOREIGN PATENT DOCUMENTS 4-142486  5/1992  Japan .

*Primary Examiner*—Ian J. Lobo
*Attorney, Agent, or Firm*—Pillsbury Madison & Sutro LLP

[57] ABSTRACT

An onboard radar system for a vehicle using the FM-CW method is provided. The radar system includes a mode changer. The mode changer provides a first mode which is suitable to detect a target existing distant from the vehicle. The mode changer also provides a second mode which is suitable to detect a target existing nearby the vehicle. The radar system detects a pair of beat frequencies in the first mode. Further, the radar system detects another pair of beat frequencies in the second mode. The radar system detects a target based on a pair of base beat frequencies which are determined based on an analysis result of both pairs of the beat frequencies.

14 Claims, 17 Drawing Sheets

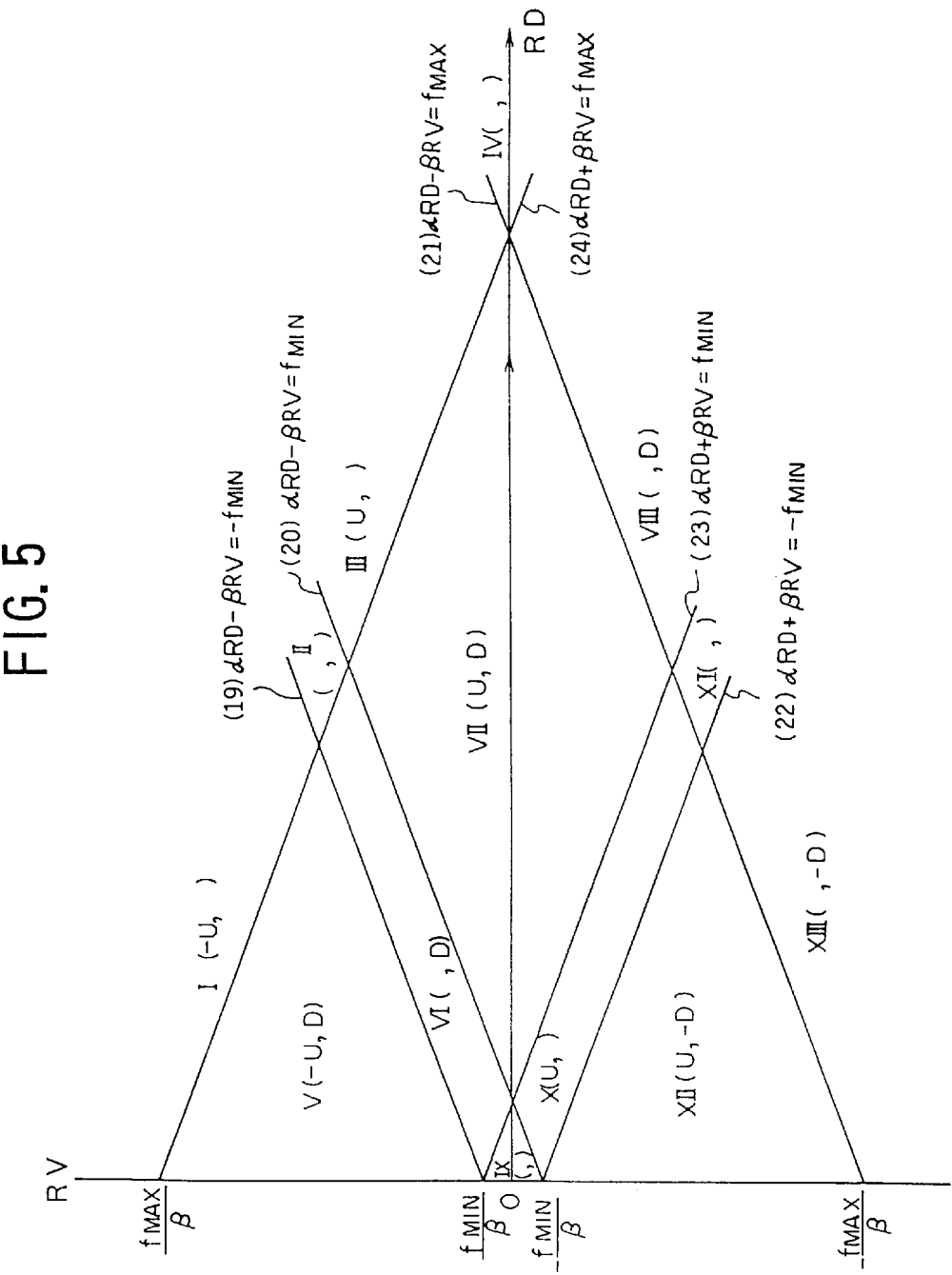

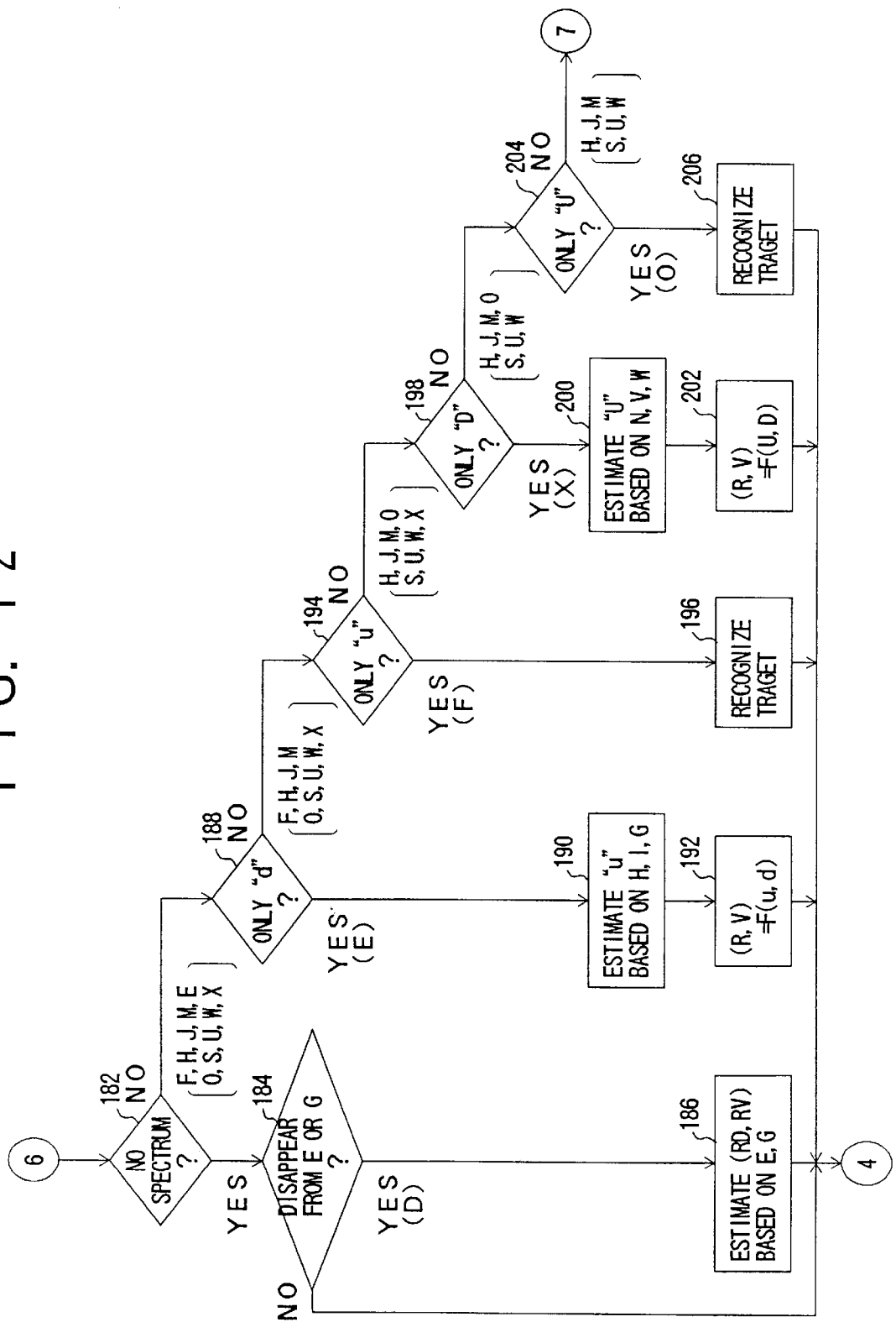

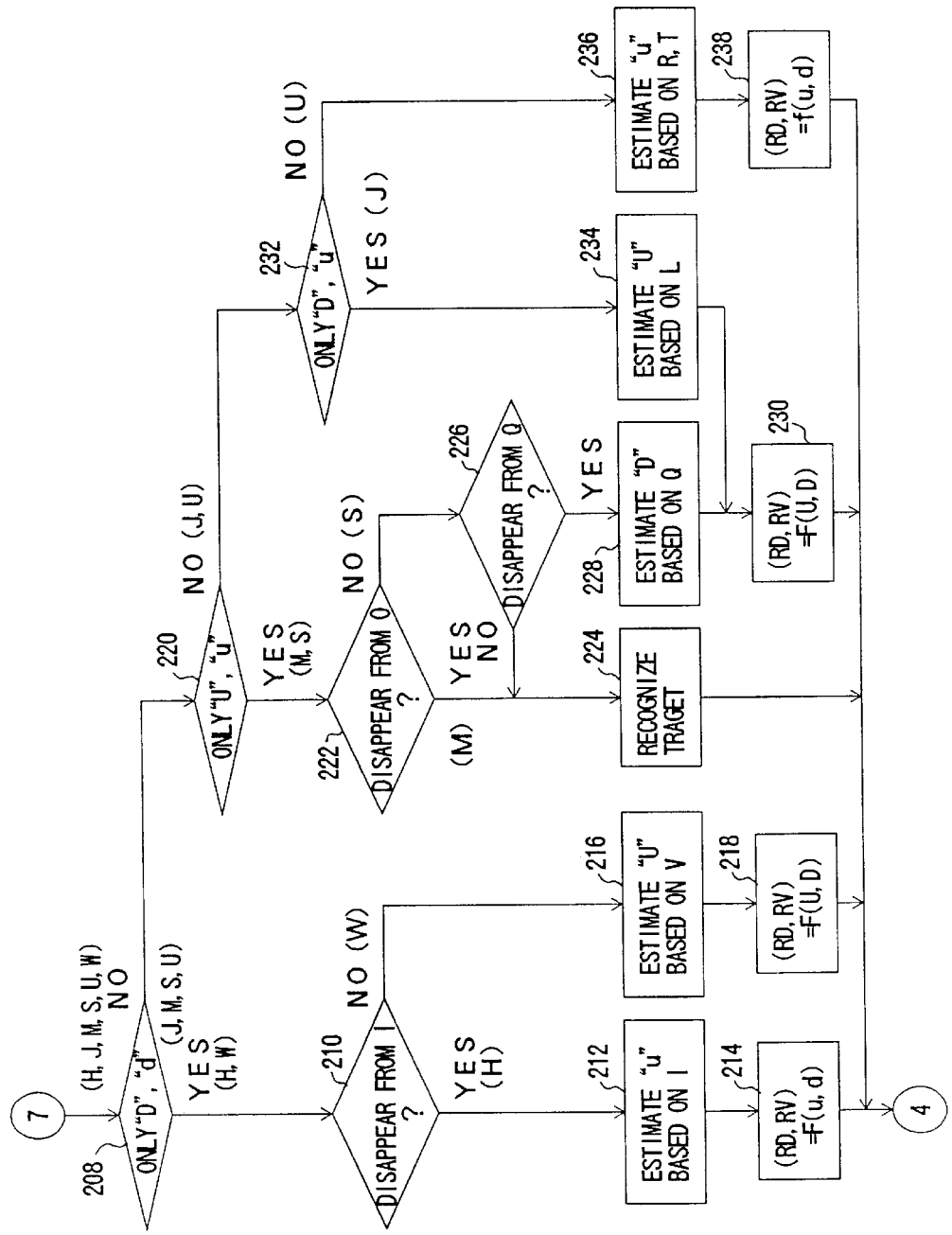

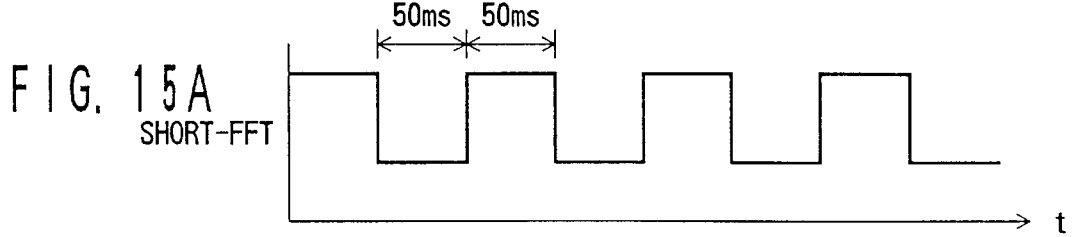
FIG. 15A SHORT-FFT
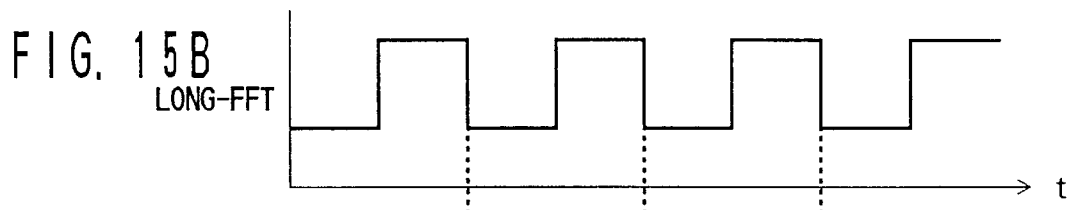
FIG. 15B LONG-FFT
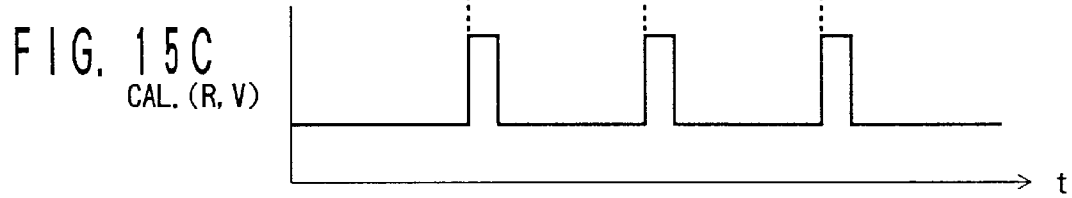
FIG. 15C CAL. (R, V)

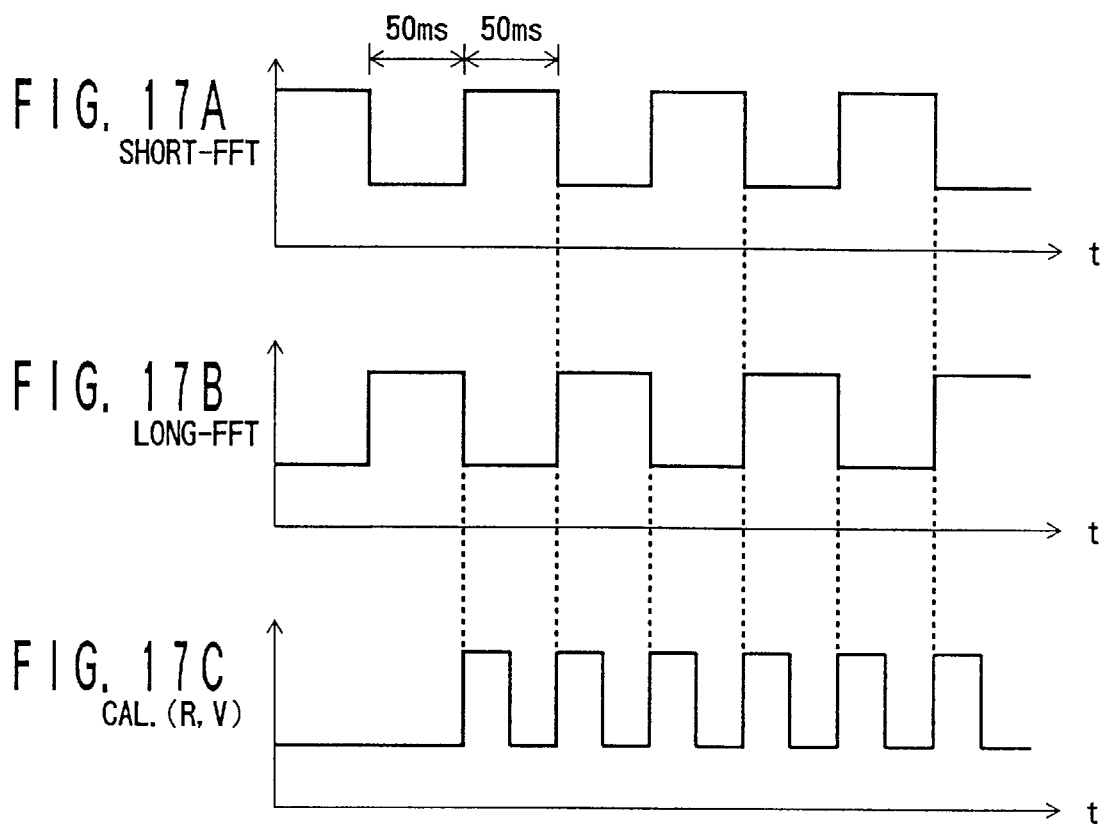

ONBOARD RADAR SYSTEM FOR A VEHICLE

BACKGROUND OF THE INVENTION

1. Field of the Invention

The present invention generally related to an onboard radar system for a vehicle and, more particularly, to an onboard radar system suitable to detect targets existing ahead of a vehicle.

2. Description of the Related Art

Conventionally, a radar system of a FM-CW (Frequency Modulation-Continuous Wave) type is known as disclosed in Japanese Laid-open Patent Application No.4-142486. The radar system has a transmitting antenna that transmits a transmitted wave converted from a transmitted signal. A modulator transmitting the transmitted signal is electrically connected to the transmitting antenna. The modulator changes a modulated frequency F of the transmitted signal so that the modulated frequency F repeatedly increases and decreases within a predetermined width $\Delta F$, about a predetermined frequency fm, with fixed changing rate. Hereinafter, the frequency fm is referred to as repeating frequency fm.

The radar system has a receiving antenna that receives a reflected wave of the transmitted wave. The receiving antenna converts the reflected wave to a received signal. The received signal vibrates with the same frequency as that of the reflected wave and has an output power according to the energy of the reflected wave.

The radar system has a signal processor that detects a beat frequency fb, which is equal to the difference between the modulated frequency F generated by the modulator and a received frequency F' of the received signal. The beat frequency fb includes information with respect to a relative distance RD and a relative velocity RV between a target that reflects the transmitted wave and the radar system. The signal processor detects the relative distance RD and the relative velocity RV based on the beat frequency fb.

An acceptable range of the beat frequency fb that the signal processor can accept is limited to a predetermined range. Hereinafter, the acceptable range is expressed by $fmin \leq fb < fmax$. In this case, the radar system can detect targets that exist ahead of a vehicle and generate a beat frequency fb, which satisfies the condition $fmin \leq fb \leq fmax$.

The beat frequency fb increases as the relative distance RD increases. Thus, an upper limit of a dynamic range of the radar system is fixed by a condition fb=fmax. Accordingly, the upper limit of the dynamic range expands as a ratio expressed by fb/RD decreases. On the other hand, a lower limit of the dynamic range of the radar system is fixed by a condition fmin=fb. Accordingly, the lower limit of the dynamic range approaches the radar system, as the ratio expressed by fb/RD increases.

The system discussed above has a function changing the repeating frequency fm of the changing cycle of the modulated frequency F to a high level or a low level. The beat frequency fb decreases as the repeating frequency fm decreases. Therefore, the fb/RD ratio decreases when the repeating frequency fm is set to the low level as compared to when the repeating frequency fm is set to the high level. Accordingly, the radar system can expand the upper limit of the dynamic range ahead of the vehicle by fixing the repeating frequency fm to the low level. Further, the radar system can bring the lower limit of the dynamic range close thereto by fixing the repeating frequency fm to the high level.

In other words, the radar system can form both a long distance dynamic range and a short distance dynamic range by changing the repeating frequency fm to the low level or the high level. Therefore, the radar system discussed above can provide a larger dynamic range as compared to a radar system that does not have a function changing a scope of a dynamic range.

However, the dynamic range of the radar system, i.e., a total of the long distance dynamic range and the short distance dynamic range, covers only a part of an area expanding ahead of the vehicle. Accordingly, the dynamic range of the radar system is not necessarily enough.

SUMMARY OF THE INVENTION

It is general object of the present invention to provide a novel and useful onboard radar system for a vehicle.

A more specific object of the present invention is to provide an onboard radar system for a vehicle that has a wide dynamic range expanding from a short distance area to a long distance area.

The above objects of the present invention are achieved by an onboard radar system for a vehicle. The radar system includes a transmitter that transmits a transmitted wave toward a predetermined direction; a modulator that repeatedly increases and decreases a modulated frequency of the transmitted wave with a predetermined repeated frequency; a receiver that receives a reflected wave which is generated when the transmitted wave is reflected by a target and a beat frequency generator that generates beat frequencies based on the reflected wave.

The radar system also includes a beat frequency detector that detects an up beat frequency and a down beat frequency, which are generated during an up period where the modulated frequency increases and a down period where the modulated frequency decreases, respectively. The radar system further includes a transmitting mode changer that provides a first mode which is suitable to detect an up beat frequency and a down beat frequency having a correct sign when the target is distant from the vehicle and a second mode which is suitable to detect the up beat frequency and the down beat frequency having a correct sign when the target is nearby the vehicle by changing a state of the transmitted wave.

Moreover, the beat frequency detector includes a Long-UP beat frequency detector that detects the up beat frequency detected in the first mode as a Long-UP beat frequency; a Long-DOWN beat frequency detector that detects the down beat frequency detected in the first mode as a Long-DOWN beat frequency; a Short-up beat frequency detector that detects the up beat frequency detected in the second mode as a Short-up beat frequency; and a Short-down beat frequency detector that detects the down beat frequency detected in the second mode as a Short-down beat frequency.

The radar system further includes an analyzer that analyzes, the Long-UP beat frequency, the Long-DOWN beat frequency, the Short-up beat frequency and the Short-down beat frequency; a base beat frequency provider that provides a pair of base beat frequencies which is determined based on an analysis result of the analyzer; and a target detector that detects the target based on the pair of base beat frequencies.

In the radar system of the present invention, the beat frequency detector accepts a beat frequency which is between a minimum allowable frequency fmin and a maximum allowable frequency fmax. The Long-UP beat frequency, i.e., "U", has a correct sign when the "U" satisfies the condition fmin≦U≦fmax. Further, the Long-DOWN beat frequency "D", the Short-up beat frequency "u" and the Short-down beat frequency "d" have a correct sign, respectively, when the beat frequencies satisfies the condition. In the first mode, the transmitted wave is transmitted so that a condition expressed as fmin≦U,D≦fmax is satisfied when the target is distance from the vehicle. On the other hand, in the second mode, the transmitted wave is transmitted so that a condition expressed as fmin≦u,d≦fmax is satisfied when the target is nearby the vehicle.

According to the radar system of the present invention, a condition expressed as U≦-fmin is satisfied when the target exists in a predetermined area. In this case, the beat frequency detector detects a Long-UP beat frequency "-U" having a wrong sign. In the same way, the beat frequency detector detects "-D", "-u" and "-d" having a wrong sign when the target exists in a predetermined area.

Further, according to the radar system of the present invention, a condition expressed as -fmin<U<fmin may be satisfied. In this case, the beat frequency detector does not detect the Long-UP beat frequency. Also, the beat frequency detector does not detect the "D", the "u" and the "d", when a vehicle exists in a predetermined area.

As discussed above, a detected state changes in accordance with a condition of the target. The analyzer of the radar system analyzes the detected state of the beat frequencies "U", "D", "u" and "d". Further, the base beat frequency provider provides suitable beat frequencies as the base beat frequencies. According to the procedure discussed above, the target is correctly detected regardless of the condition thereof. Therefore, the radar system of the present invention provides a wide dynamic range.

Other objects and further features of the present invention will be apparent from the following detailed description when read in conjunction with the accompanying drawings.

BRIEF DESCRIPTION OF THE DRAWINGS

FIG. 5 is a two-dimensional diagram of a relative distance RD and a relative velocity showing couplings of a Long-UP beat frequency U and a Long-DOWN beat frequency D detected by the radar system of the first embodiment;

FIG. 12 is a fifth part of a flowchart of a routine performed by the radar system of the first embodiment;

FIG. 13 is a sixth part of a flowchart of a routine performed by the radar system of the first embodiment;

FIG. 15A is a time chart showing a timing when the radar system of the first embodiment detects a Short-FFT result;

FIG. 15B is a time chart showing a timing when the radar system of the first embodiment detects a Long-FFT result;

FIG. 15C is a time chart showing a timing when the radar system of the first embodiment calculates the relative distance RD and the relative velocity RV;

FIG. 17A is a time chart showing a timing when the radar system of the second embodiment detects the Short-FFT result;

FIG. 17B is a time chart showing a timing when the radar system of the second embodiment detects the Long-FFT result;

FIG. 17C is time chart showing a timing when the radar system of the second embodiment calculates the relative distance RD and the relative velocity RV;

DESCRIPTION OF THE PREFERRED EMBODIMENTS

In the following, a principle and an embodiment of the present invention will be described with reference to the accompanying drawings.

Figure 1:
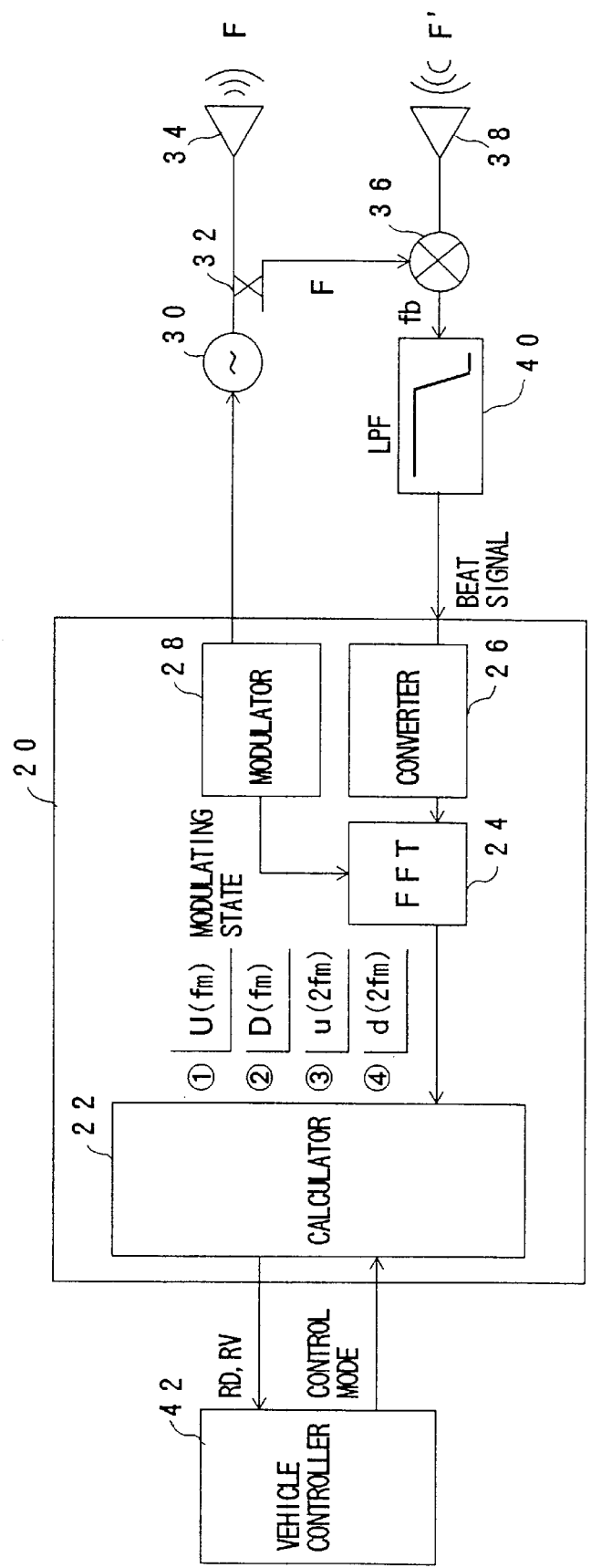
FIG. 1 is a block diagram of an onboard radar system according to a first embodiment of the present invention.

FIG. 1 shows a block diagram of an onboard radar system according to first embodiment of the present invention. The radar system is a FM-CW type radar system, used on a vehicle for detecting targets existing ahead of the vehicle, such as vehicles traveling ahead.

The radar system has a signal processor 20. The signal processor 20 includes a calculator 22, a FFT circuit 24, an A/D converter 26 and a modulator 28. The modulator 28 generates a frequency-ordering signal. The frequency-ordering signal repeatedly increases and decreases within a predetermined range, about a predetermined repeating frequency, with a fixed changing rate. The modulator 28 changes the repeating frequency of the frequency-ordering signal every 50 msec from "fm" to "2fm" or from "2fm" to "fm".

A signal generator 30 is electrically connected to the modulator 28. The signal generator 28 generates a transmitted signal vibrating with a modulated frequency F that is in accordance with the frequency-ordering signal. The modulated frequency F repeatedly increases and decreases within a predetermined frequency range ΔF, about the same frequency as the repeating frequency of the frequency-ordering signal, namely, fm or 2fm, with a predetermined changing rate. In this embodiment, a middle frequency of the modulated frequency is fixed to a predetermined value f0.

A directional coupler 32 is connected to the signal generator 30. Further, a transmitting antenna 34 and a mixer 36 are connected to the directional coupler 32. The directional coupler 32 distributes the transmitted signal generated by the signal generator 30 to the transmitting antenna 34 and the mixer 36 with a predetermined proportion. A transmitted wave having the same frequency as the transmitted signal is transmitted ahead of the vehicle when the transmitted signal is supplied to the transmitting antenna 34 from the directional coupler 32.

A receiving antenna 38 is connected to the mixer 36 together with the directional coupler 32. The receiving antenna 38 receives a reflected wave of the transmitted wave transmitted from the transmitting antenna 34. The receiving antenna 38 converts the reflected wave to a received signal having the same frequency F' as that of the reflected wave. The receiving antenna 38 supplies the received signal to the mixer 36.

The mixer 36 generates a beat signal by mixing the transmitted signal supplied from the directional coupler 32 and the received signal supplied from the receiving antenna 38. The beat signal vibrates with a frequency that is equal to the difference between the frequency of the transmitted signal and that of the received signal. The beat signal generated by the mixer 36 is supplied to a low-pass filter 40.

The low-pass filter 40 cuts off signals vibrating with a frequency exceeding a predetermined cut-off frequency fc. The cut-off frequency fc is fixed to a predetermined value that is slightly higher than a maximum frequency fmax, which is the highest acceptable frequency of the signal processor 20. High-frequency noise having a high frequency compared to the maximum frequency fmax is mixed with the beat signal in some cases. The high-frequency noise causes misdetection of the targets if the noise reaches the signal processor 20. The low-pass filter 40 prevents the misdetection from occurring by cutting off the high-frequency noise.

The beat signal reaches the A/D converter 26 after passing through the low-pass filter 40. The A/D converter 26 converts the beat signal having an analog style to a beat signal having a digital styles. The A/D converter 26 supplies the digital beat signal to the FFT circuit 24.

The FFT circuit 24 is electrically connected to the A/D converter 26 and the modulator 28. The modulator 28 supplies state signals indicating modulating states of the transmitted signal described below to the FFT circuit 24.

① First state where the repeated frequency of the modulated frequency F is "fm" and the modulated frequency F increases;

② Second state where the repeated frequency of the modulated frequency F is "fm" and the modulated frequency F decreases;

③ Third state where the repeated frequency of the modulated frequency F is "2fm" and the modulated frequency F increases; and ④ Fourth state where the repeated frequency of the modulated frequency F is "2fm" and the modulated frequency F decreases.

Hereinafter, the period where the modulated frequency F increases is referred to as an up period and the period where the modulated frequency F decreases is referred to as a down period.

The FFT circuit 24 generates frequency spectrum data by executing a frequency analysis on the beat signal. The frequency spectrum data includes spectrums according to power of each vibrating wave included in the beat signal. The FFT circuit 24 generates four kinds of the frequency spectrum data, i.e., first through fourth frequency spectrum data, each of which relates to each of the first through fourth states ①–④ discussed above.

The frequency spectrum data generated by the FFT circuit 24 is supplied to the calculator 22. The calculator 22 detects a Long-UP beat frequency "U" based on the first frequency spectrum data, which relates to the combination of the repeated frequency fm and the up period. The Long-UP beat frequency "U" is a frequency of a spectrum that shows a power exceeding a predetermined value in the first frequency spectrum data.

The calculator 22 detects a Long-DOWN beat frequency "D" based on the second frequency spectrum data relating to the combination of the repeated frequency fm and the down period; a Long-up beat frequency "u" based on the third frequency spectrum data relating to the combination of the repeated frequency 2fm and the up period; and a Long-down beat frequency "d" based on the fourth frequency spectrum data relating to the combination of the repeated frequency 2fm and the down period in the same manner of detecting the Long-UP beat frequency "U".

The calculator 22 calculates data relating to the targets existing ahead of the vehicle, more particularly, calculates a relative distance RD and a relative velocity RV between the targets and the radar system based on the four kinds of beat frequencies "U", "D", "u" and "d". A vehicle controller 42 is electrically connected to the calculator 22. The calculator 22 supplies the data relating to the targets to the vehicle controller 42.

The vehicle controller 42 performs vehicle controls such as an intelligent cruise control (IC control), a traffic congestion cruise control (TCC control) and a collision preventing control (CP control). The IC control is a control for making the vehicle follow a vehicle traveling ahead while keeping the relative distance RD almost changeless. The TCC control is a control for making the vehicle follow a vehicle traveling ahead, in a road congested by traffic. Further, the CP control is a control for generating a braking force automatically when the vehicle approaches nearby a target existing ahead with an approaching relative velocity exceeding a predetermined value.

The vehicle controller 42 performs the IC control, the TCC control or the CP control when an IC mode, a TCC mode or a CP mode is selected by a driver of the vehicle. A mode signal indicating the kind of control performed by the vehicle is supplied to the calculator 22. As discussed below, the calculator 22 calculates the relative distance RD and the relative velocity RV in a suitable manner corresponding to the control performed by the vehicle controller 42.

Now, an explanation of a principle by which the radar system of the present embodiment detects the targets will be given with reference to FIG. 2 and FIG. 3.

Figure 2:
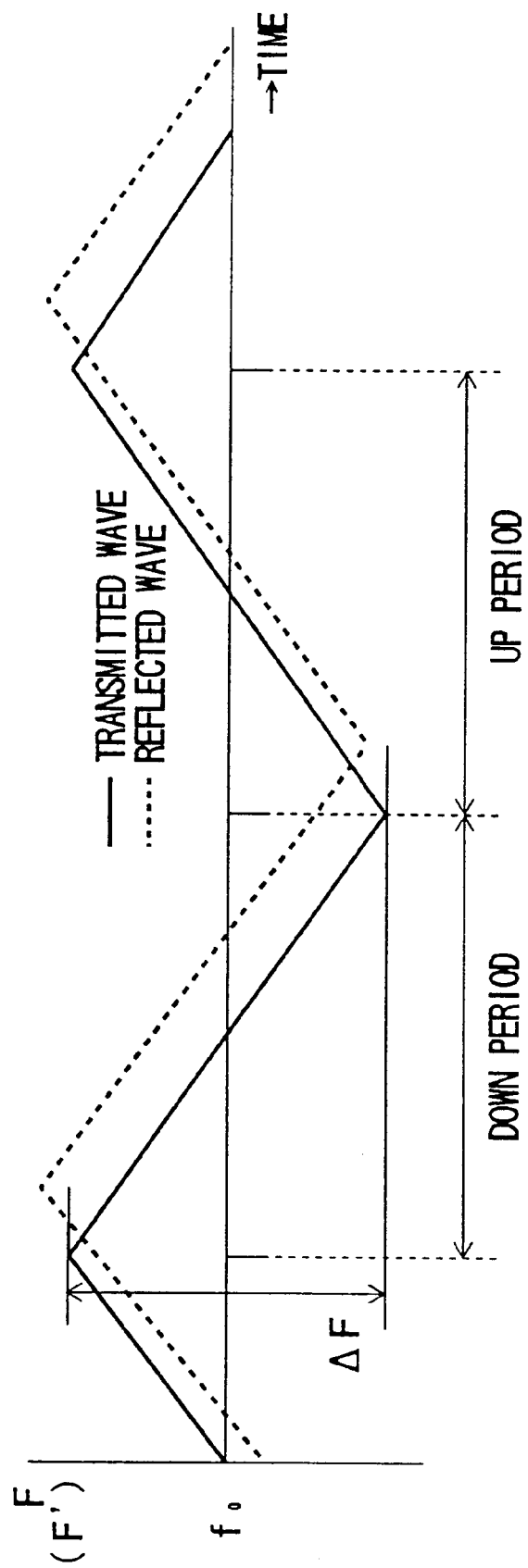
FIG. 2 is a time chart of modulated frequency F of a transmitted wave and a frequency F' of a reflected wave.

FIG. 2 shows a time chart of the modulated frequency F of the transmitted wave and the frequency F' of the reflected wave. In FIG. 2, a waveform indicated by a solid line corresponds to the transmitted wave and a waveform indicated by a dotted line corresponds to the reflected wave. The modulated frequency F shown in FIG. 2 repeatedly increases and decreases with the repeated frequency fm.

Figure 3:
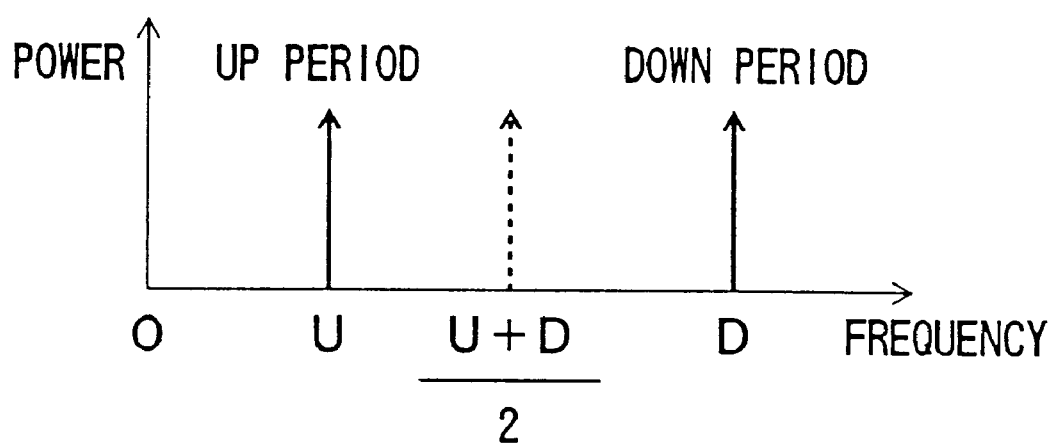
FIG. 3 is an example of a spectrum detected by the radar system of the first embodiment.

FIG. 3 shows frequency spectrum data including spectrum data generated based on a beat signal detected during the down period shown in FIG. 2 and spectrum data generated based on a beat signal detected during the up period shown in FIG. 2. Frequencies "U" and "D" shown in FIG. 3 are the Long-UP beat frequency U and the Long-DOWN beat frequency D discussed above, respectively. Further, frequency "(U+D)/2" shown in FIG. 3 is the middle frequency of the beat frequencies "U" and "D".

As discussed above, the transmitted wave vibrates with the modulated frequency F, which has the middle frequency f0 and repeatedly increases and decreases within a predetermined frequency range ΔF. When the transmitted wave is irradiated to a target, the target reflects the transmitted wave and generates the reflected wave. The receiving antenna 38 receives the reflected wave when a delay time Δt corresponding to the relative distance RD between the vehicle and the target has passed after the transmitted wave causing the reflected wave is transmitted from the transmitting antenna 34. Further, in a case where the target has a relative velocity RV, a Doppler frequency FD corresponding to the relative velocity RV is mixed with the frequency F' of the reflected wave.

The delay time Δt is expressed as shown below by using the relative distance RD and a propagation speed c0 of the transmitted wave.

$$\Delta t = 2RD/c0 \tag{1}$$

Further, the changing rate of the modulated frequency F' i.e., dF/dt, is expressed as shown below by using the repeated frequency fm and the changing width ΔF.

$$dF/dt = 2\Delta F \cdot fm \tag{2}$$

A frequency difference FST is generated between the reflected wave and the transmitted wave caused by the delay time Δt. The frequency difference FST is expressed as below by using the above relationships (1) and (2).

$$FST = \Delta t \cdot dF/dt = (4\Delta F \cdot fm/c0) \cdot RD \tag{3}$$

In the present embodiment a relative velocity RV is defined so that the RV has a positive sign when the vehicle and the target approach each other. In this case, the Doppler frequency FD is approximately expressed as below.

$$FD = (2f0/c0) \cdot RV \tag{4}$$

The FST caused by the delay time Δt makes the frequency F' (dotted line shown in FIG. 2) of the reflected wave higher than the frequency F (solid line shown in FIG. 2) of the transmitted wave during the down period. Further, the Doppler frequency FD makes the frequency F' higher than the frequency F when the RV shows a positive sign. Accordingly, in a case where the repeated frequency is fm, the beat frequency during the down period, i.e., the Long-DOWN beat frequency "D", is expressed as shown below.

$$D = |(4\Delta F \cdot fm/c0) \cdot RD + (2f0/c0) \cdot RV| \tag{5}$$

On the other hand, the FST makes the frequency F' (dotted line shown in FIG. 2) of the reflected wave lower than the frequency F (solid line shown in FIG. 2) of the transmitted wave during the up period. Accordingly, in a case where the repeated frequency is fm, the beat frequency during the up period, i.e., the Long-UP beat frequency "U", is expressed as shown below.

$$U = |(4\Delta F \cdot fm/c0) \cdot RD - (2f0/c0) \cdot RV| \tag{6}$$

In the present embodiment, the FST =(4ΔF·fm/c0)·RD is sufficiently larger than the FD =(2f0/c0)·RV. Thus, the formulas (5) and (6) are rewritten as below.

$$D = (4\Delta F \cdot fm/c0) \cdot RD + (2f0/c0) \cdot RV \tag{7}$$

$$U = (4\Delta F \cdot fm/c0) \cdot RD - (2f0/c0) \cdot RV \tag{8}$$

The (4ΔF·fm/c0) and the (2f0/c0) shown in the formula (7) and (8) are constants that are fixed to predetermined values in accordance with required characteristics of the radar system. Thus, the formulas (7) and (8) are rewritten as shown below using constants α and β instead of the (4ΔF·fm/c0) and the (2f0/c0).

$$D = \alpha \cdot RD + \beta \cdot RV \tag{9}$$

$$U = \alpha \cdot RD - \beta \cdot RV \tag{10}$$

According to the relationships shown in formulas (9) and (10), the relative distance RD and the relative velocity RV are respectively expressed as shown below.

$$RD = (D+U)/2\alpha \tag{11}$$

$$RV = (D-U)/2\beta \tag{12}$$

As discussed above, the relative distance RD and the relative velocity RV of the target are calculated based on the Long-UP beat frequency "U" and the Long-DOWN beat frequency "D".

The FFT circuit 24 performs spectrum analysis on the beat signals detected during the up period and the down period. As a results the FFT circuit 24 detects the frequency spectrum data including a spectrum having the Long-UP beat frequency "U" and a spectrum having the Long-DOWN beat frequency "D". Thus, the radar system detects the frequency spectrum data such as shown in FIG. 3 whenever one cycle of the increasing and decreasing of the modulated frequency F is finished. The calculator 22 calculates the relative distance RD and the relative velocity RV of the target by applying the "U" and the "D" detected based on the frequency spectrum data to the above formulas (11) and (12).

According to the radar system of the present embodiment, the Short-up beat frequency "u" and the Short-down beat frequency "d" are detected in a case where the repeated frequency is 2fm. The Short-up beat frequency "u" and the Short-down beat frequency "d" are expressed as shown below by substituting 2fm for fm of the above formulas (5) and (6).

$$d = |(8\Delta F \cdot fm/c0) \cdot RD + (2f0/c0) \cdot RV| \tag{13}$$

$$u = |(8\Delta F \cdot fm/c0) \cdot RD - (2f0/c0) \cdot RV| \tag{14}$$

The formulas (13) and (14) are rewritten as shown below using the constants α and β.

$$d = 2\alpha \cdot RD + \beta \cdot RV \tag{15}$$

$$u = 2\alpha \cdot RD - \beta \cdot RV \tag{16}$$

According to the relationships shown in formulas (15) and (16), the relative distance RD and the relative velocity RV are respectively expressed as below.

$$RD=(d+u)/4\alpha \quad (17)$$

$$RV=(d-u)/2\beta \quad (18)$$

The FFT circuit 24 generates the frequency spectrum data related to the repeated frequency fm and 2fm independently. The frequency spectrum data including the Short-up beat frequency "u" and the Short-down beat frequency "d" is detected whenever one cycle of the increasing and decreasing of the modulated frequency is finished in a case where the repeated frequency is 2fm. The calculator 22 also calculates the relative distance RD and the relative velocity RV of the target by applying the "u" and the "d" detected based on the frequency spectrum data to the above formulas (17) and (18).

The beat frequencies "U" and "u", which are detected during the up period, decreases as the relative distance RD decreases or as the relative velocity RV increases (see the formulas (10) and (16)).

Figure 4A:
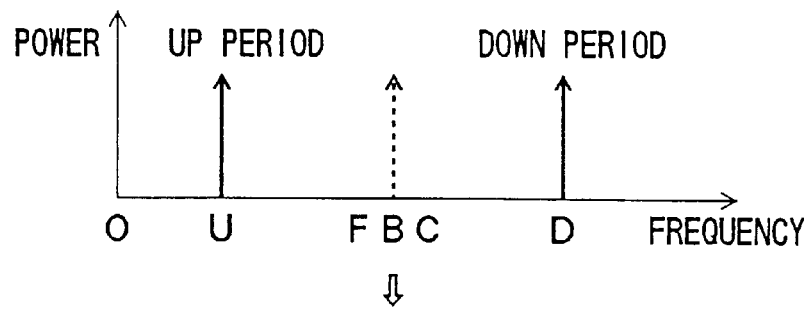
FIG. 4A is an example of a spectrum detected by the radar system of the first embodiment when a target approaching the radar system exists at a first point which is a long distance from the radar system.
Figure 4B:
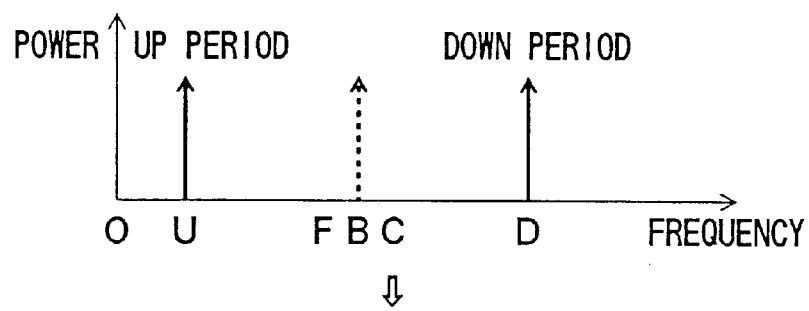
FIG. 4B is an example of a spectrum detected by the radar system of the first embodiment when the target approaching the radar system exists at a second point which is closer to the radar system than the first point.

FIG. 4A through FIG. 4D show frequency spectrum data that is detected while a target approaches the vehicle with a constant relative velocity RV. The frequency spectrum data shown in FIG. 4A and FIG. 4B is detected in a situation where the target is sufficiently distant from the vehicle. The radar system of the present embodiment detects the Long-UP beat frequency "U" and the Long-DOWN beat frequency "D" correctly in the situation discussed above.

Figure 4C:
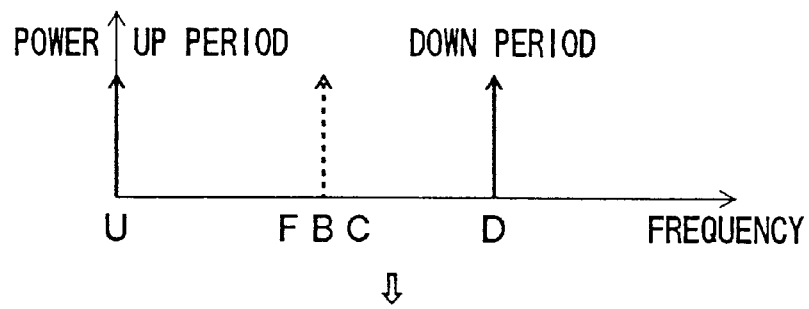
FIG. 4C is an example of a spectrum detected by the radar system of the first embodiment when the target approaching the radar system exists at a third point which is closer to the radar system than the second point.

The frequency spectrum data shown in FIG. 4C is detected when the target further approaches the vehicle from a position corresponding to FIG. 4B. As shown in FIG. 4C, the Long-UP beat frequency "U" decreases to near zero when the target having the constant relative velocity RV approaches nearby the vehicle. The FFT circuit 24 does not detect a vibrating wave having a frequency lower than a minimum frequency fmin, which is the smallest acceptable frequency of the FFT circuit 24. Therefore, the beat frequency "U" of the up period is not detected in a situation where a condition U<fmin is satisfied, such as shown in FIG. 4C.

Figure 4D:
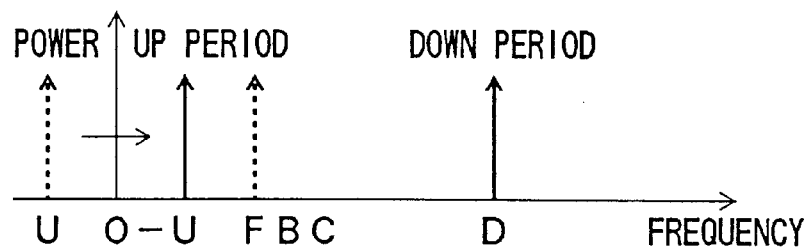
FIG. 4D is an example of a spectrum detected by the radar system of the first embodiment when the target approaching this radar system exists at a fourth point which is closer to the radar system than the second point.

The frequency spectrum shown in FIG. 4D is detected when the target further approaches the vehicle from a position corresponding to FIG. 4C. In FIG. 4D, frequency spectrum data "U" indicated by a dotted lone is the Long-UP beat frequency "U" calculated by using the formula (10).

The frequency F' of the reflected wave of the up period exceeds the modulated frequency F of the transmitted signal when the target further approaches the vehicle after the Long-UP beat frequency "U" decreases near to zero. According to the formula (10), a Long-UP beat frequency "U" having a negative sign is calculated in such a situation. Therefore, it is necessary to detect the "U" having a negative sign such as the dotted line shown in FIG. 4D for detecting the relative distance RD and the relative velocity RV correctly by using the above formulas (11) and (12).

However, the FFT circuit 24 always generates a frequency spectrum in accordance with an absolute value |F-F'| regardless whether the modulated frequency F is larger than the frequency F' or not. Thus, in a case where an absolute value of the "U" (<0), i.e., "U", exceeds the minimum frequency fmin, namely, in a case where a condition $-U \geq fmin$ is satisfied, the FFT circuit 24 detects a spectrum having a frequency "-U", as shown in FIG. 4D by a solid line.

As discussed above, a detecting ability with respect to the Long-UP beat frequency "U" of the FFT circuit 24 changes in accordance with a relative relationship between the "U" and the fmin. The FFT circuit 24 does not accept a vibrating wave having a frequency exceeding a maximum frequency fmax, which is the largest acceptable frequency of the FFT circuit 24. Therefore, the detecting ability with respect to the Long-UP beat frequency "U" of the FFT circuit 24 changes in accordance with a relative relationship between the "U" and the fmax.

In the present embodiment, detected results with respect to the "U" of the FFT circuit 24 are expressed as shown below using the fmin and the fmax.

| CONDITION | DETECTED RESULTT |
|---|---|
| ① U ≤ -fmin | ; -U (wrong sign) |
| ② -fmin < U < fmin impossible to detect | ; |
| ③ fmin < U < fmax (correct sign) | ; U |
| ④ fmax < U impossible to detect | ; |

The Long-DOWN beat frequency "D" is lower than the Long-UP beat frequency "U" when the target existing ahead of the vehicle has a leaving relative velocity RV. Accordingly, in a case where the target is leaving the vehicle with a high relative velocity RV, a situation where the Long-DOWN beat frequency "D" is lower than the fmin occurs. Further, a situation where the frequency "D" is lower than the -fmin occurs.

Therefore, a detecting ability with regard to the Long-DOWN beat frequency "D" of the FFT circuit 24 changes in accordance with a relative relationship between the "D" and the fmin. Further, the FFT circuit 24 does not detect the Long-DOWN beat frequency "D" when the "D" exceeds the fmax in the same way as the Long-UP frequency "U" exceeds the fmax.

As discussed above, the detecting ability with regard to the Long-DOWN beat frequency "D" of the FFT circuit 24 changes corresponding to the relative relationship between the "D" and the fmin, and the relative relationship between the "D" and the fmax.

In the present embodiment, detected results with respect to the "D" of the FFT circuit 24 are expressed as shown below using the fmin and the fmax.

| CONDITION | DETECTED RESULTT |
|---|---|
| ⑤ D ≤ -fmin | ; -D (wrong sign) |
| ⑥ -fmin < D < fmin impossible to detect | ; |
| ⑦ fmin < D < fmax | ; D (correct sign) |
| ⑧ fmax < D impossible to detect | ; |

The areas expressed by the above conditions ①~④ are divided by lines satisfying formulas (19)~(21) indicated below. Further, the areas expressed by the above conditions ⑤~⑧ are divided by lines satisfying formulas (22)~(24) indicated below.

$$U=\alpha \cdot RD-\beta \cdot RV=-fmin \quad (19)$$

$$U=\alpha \cdot RD-\beta \cdot RV=fmin \quad (20)$$

$$U=\alpha \cdot RD-\beta \cdot RV=fmax \quad (21)$$

$$D=\alpha \cdot RD+\beta \cdot RV=-fmin \quad (22)$$

$$D=\alpha \cdot RD+\beta \cdot RV=fmin \quad (23)$$

$$D = \alpha \cdot RD + \beta \cdot RV = fmax \tag{24}$$

FIG. 5 shows a two-dimensional diagram of the relative distance RD and the relative velocity RV. The lines satisfying the formulas (19)~(24) are indicated in FIG. 5. The data marks such as (U, D) and (U, –D) indicated in FIG. 5 are combinations of absolute values of the Long-UP beat frequency "U" and the Long-DOWN beat frequency "D" calculated based on the above formulas (9) and (10). Namely, the data marks are combinations of the "U" and the "D" actually detected by the FFT circuit 24.

The FFT circuit 24 detects the "U" and the "D" based on the relative distance RD and the relative velocity RV as discussed above. In FIG. 5, each of the data marks accords to the combination of the "U" and the "D" detected by the FFT circuit 24 based on the RD and the RV that belong to each area divided by the lines. Incidentally, areas given a coordinate code including a blank part such as ( , ) are the areas where the beat frequency in accordance with the blank part is not detected by the FFT circuit 24.

In FIG. 5, areas I and V indicated above a line (19) are areas where the above condition ① is satisfied. Accordingly, the FFT circuit 24 detects the Long-UP beat frequency "–U" having a wrong sign in those areas I and V.

Areas II, VI and IX divided between the line (19) and a line (20) are areas where the above condition ② is satisfied. Accordingly, the FFT circuit 24 does not detect the Long-UP beat frequency "U" in those areas II, VI and IX.

Areas III, VII, X and XII divided between the line (20) and a line (21) are areas where the above condition ③ is satisfied. Accordingly, the FFT circuit 24 detects the Long-UP beat frequency "U" having a correct sign in those areas III, VII, X and XII.

Areas IV, VIII, XI and XIII indicated below the line (21) in FIG. 5 are areas where the above condition ④ is satisfied. Accordingly, the FFT circuit 24 does not detect the Long-UP beat frequency "U" in those areas IV, VIII, XI and XIII.

Further, in FIG. 5, areas XII and XIII indicated below a line (22) are areas where the above condition ⑤ is satisfied. Accordingly, the FFT circuit 24 detects the Long-DOWN beat frequency "–D" having a wrong sign in those areas XII and XIII.

Areas IX, X and XI divided between the line (22) and a line (23) are areas where the above condition ⑥ is satisfied. Accordingly, the FFT circuit 24 does not detect the Long-DOWN beat frequency "D" in those areas IX, X and XI.

Areas V, VI, VII and VIII divided between the line (23) and a line 124) are areas where the above condition ⑦ is satisfied. Accordingly, the FFT circuit 24 detects the Long-DOWN beat frequency "D" having a correct sign in those areas V, VI, VII and VIII.

Areas I, II, III and IV indicated above the line (24) in FIG. 5 are areas where the above condition ⑧ is satisfied. Accordingly, the FFT circuit 24 does not detect the Long-DOWN beat frequency "D" in those areas I, II, III and IV.

It is necessary to detect both of the beat frequencies "U" and "D" correctly to detect the relative distance RD and the relative velocity RV correctly. As shown in FIG. 5, the FFT circuit 24 can detects both the "U" and the "D" correctly only in the area VII. Thus, according to a manner in which the radar system detects the RD and the RV based on the "U" and the "D" actually detected by the FFT circuit 24, the area where both the RD and the RV are detected correctly is identified only as the area VII. In this case, the dynamic range of the radar system accords to the area VII.

As discussed above, the radar system of the present embodiment alternatively repeatedly detects a combination of the beat frequencies (U, D) corresponding to the repeated frequency fm and a combination of the repeated frequencies (u, d) corresponding to the repeated frequency 2fm every 50 msec. Moreover, the radar system also calculates the relative distance RD and the relative velocity RV by applying the (u, d) to the above formulas (17) and (18).

The detected result of the (u, d) changes as shown below corresponding to the relative relationship between values thereof and the fmin, and the relative relationship between the values and the fmax in the same way that the result of the (U, D) changes.

| CONDITION | DETECTED RESULTT |
|---|---|
| ① u ≦ –fmin | ; –u (wrong sign) |
| ② –fmin < u < fmin impossible to detect | ; |
| ③ fmin < u < fmax | ;u (correct sign) |
| ④ fmax < u | ; impossible to detect |
| ⑤ d ≦ –fmin | ; –d (wrong sign) |
| ⑥ –fmin < d < fmin impossible to detect | ; |
| ⑦ fmin < d < fmax | ; d (correct sign) |
| ⑧ fmax < d impossible to detect | ; |

The areas expressed by the above conditions ①~④ are divided by lines satisfying formulas (25)~(27) indicated below. Further, the areas expressed by the above conditions ⑤~⑧ are divided by lines satisfying formulas (28)~(30) indicated below.

$$u = 2\alpha \cdot RD - \beta \cdot RV = -fmin \tag{25}$$

$$u = 2\alpha \cdot RD - \beta \cdot RV = fmin \tag{26}$$

$$u = 2\alpha \cdot RD - \beta \cdot RV = fmax \tag{27}$$

$$d = 2\alpha \cdot RD + \beta \cdot RV = -fmin \tag{28}$$

$$d = 2\alpha \cdot RD + \beta \cdot RV = fmin \tag{29}$$

$$d = 2\alpha \cdot RD + \beta \cdot RV = fmax \tag{30}$$

Figure 6:
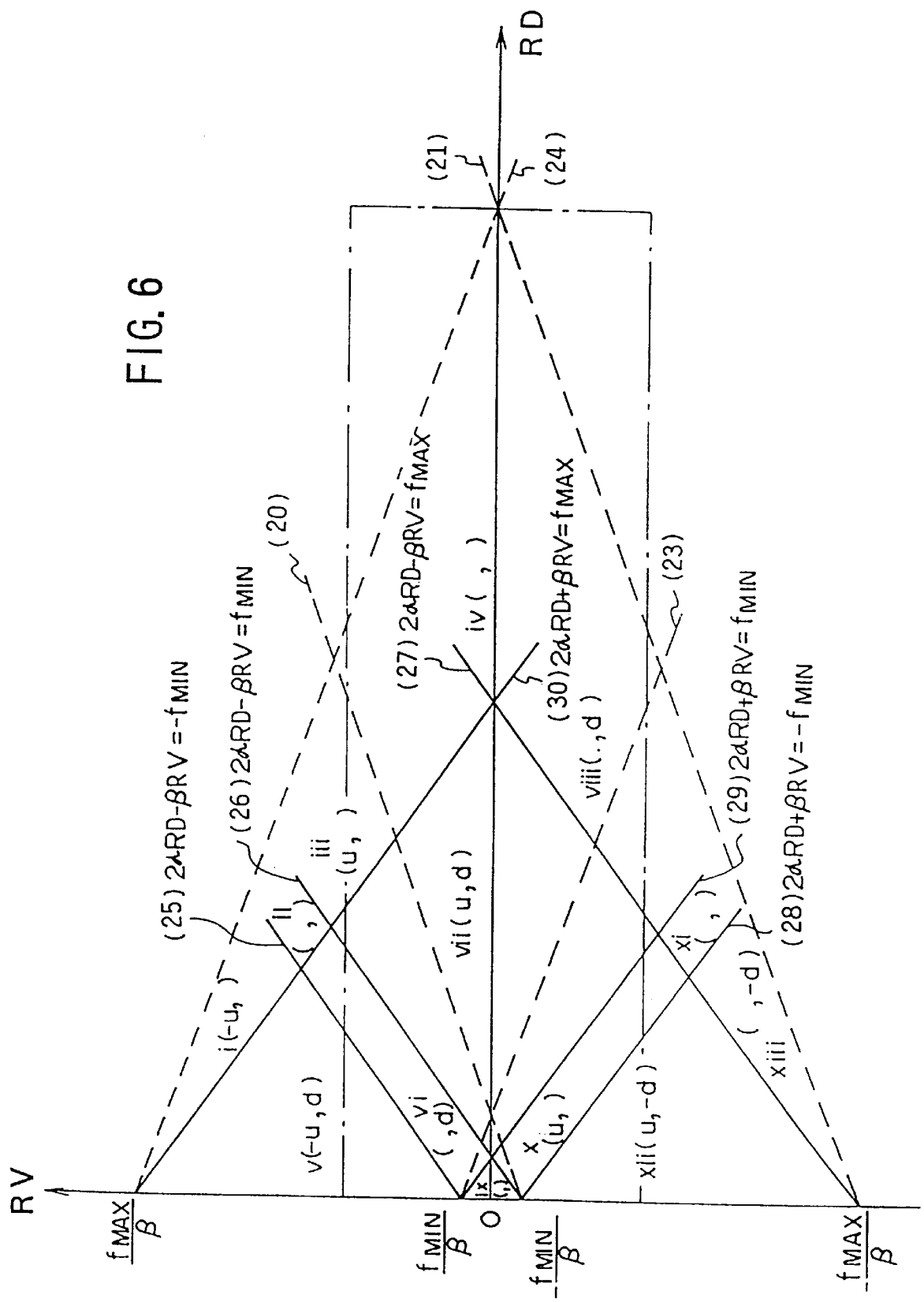
FIG. 6 is a two-dimensional diagram of the relative distance RD and the relative velocity showing couplings of a Short-up beat frequency u and a Short-down beat frequency d detected by the radar system of the first embodiment.

FIG. 6 shows a two-dimensional diagram of the relative distance RD and the relative velocity RV including solid lines satisfying the formulas (25)~(30) together with dotted lines satisfying the above formulas (20), (21), (23) and (24) The data marks such as (u, d) and (u, –d) indicated in FIG. 5 are combinations of absolute values of the Short-up beat frequency "u" and the Short-down beat frequency "d" actually detected by the FFT circuit 24.

In FIG. 6, each of the data marks accords to the combination of the "u" and the "d" detected by the FFT circuit 24 based on the RD and the RV that belong to each area divided by the lines.

Lines (25)~(30) indicated in FIG. 6 divide the two-dimensional diagram of the RD and the RV into thirteen areas, i.e., an area i through an area xiii shown in FIG. 6. The FFT circuit 24 detects the "u" and the "d" in each area of the thirteen areas i through xiii in the same combination as the "U" and the "D" detected in the thirteen areas I through XIII indicated in FIG. 5.

Therefore, according to a manner where the radar system detects the RD and the RV based on the "u" and the "d" actually detected by the FFT circuit 24, the area where both of the RD and the RV are detected correctly is identified only as the area vii. In this case, the dynamic range of the radar system accords to the area vii.

The area VII shown in FIG. 5 extends ahead of the vehicle including an area which has a comparatively long relative distance RD. On the other hand, the area vii shown in FIG. 6 extends ahead of the vehicle including an area which has a comparatively short relative distance RD. Accordingly, the radar system provides a wide dynamic range extending near the vehicle to far from the vehicle even when the relative distance RD and the relative velocity RV are detected directly based on the (U, D) and the (u, d) actually detected by the FFT circuit 24.

However, it is useful to broaden the dynamic range of the radar system for increasing the accuracy of the vehicle control such as the IC control. The area enclosed by a chain line shown in FIG. 6 is one suitable example of the dynamic range, which the radar system should provide. Hereinafter the area enclosed by the chain line is referred to as a target dynamic range. The target dynamic range is wider than a total area of the area VII and the area vii.

Accordingly, it is impossible to cover the target dynamic range only by detecting the relative distance RD and the relative velocity RV directly based on the (U, D) and the (u, d) actually detected by the FFT circuit 24. The radar system of the present embodiment has a feature of where providing a dynamic range wider than the total of the area VII and the area vii. A description of the feature of the radar system will be given below with reference to FIG. 7 through FIG. 15.

Figure 7:
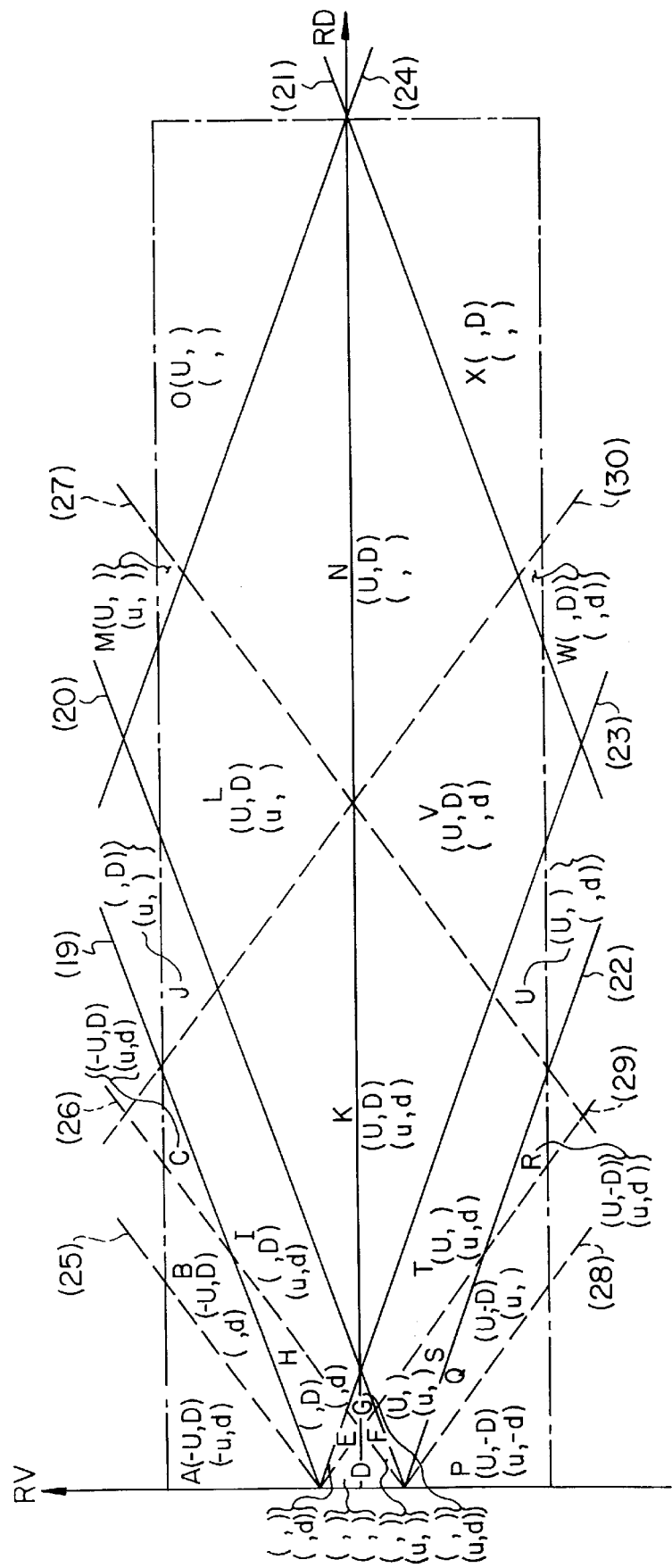
FIG. 7 is a two-dimensional diagram of the relative distance RD and the relative velocity showing couplings of the (U, D) and the (u, d) shown in FIG. 5 and FIG. 6.

FIG. 7 shows a two-dimensional diagram indicating the target dynamic range discussed above. As shown in FIG. 7, the target dynamic range is divided into twenty-four areas, i.e. an area A through an area X by the lines (19)~(24) indicated by a real line and the lines (25)~(30) indicated by a dotted line.

Data marks such as (U, D) and (u, d) indicated in each area shown in FIG. 7 are combinations of the beat frequencies that are detected in each area. As shown in FIG. 7, there are some areas where neither a combination (U, D) nor a combination (u, d) is detected correctly in the target dynamic area. The radar system of the present embodiment detects targets existing in such areas.

FIG. 8 through FIG. 13 show a flowchart of a routine that the calculator 22 performs to provide the function discussed above. The present routine is started repeatedly whenever a series of procedures thereof is finished. When the routine is started, a procedure of step 100 is performed first.

In step 100, it is determined whether a FFT analytic result with regard to the Short-up beat frequency "u" and the Short-down beat frequency "d" is input to the calculator 22. Hereinafter the FFT analytic result is referred to as a Short-FFT results. The procedure of the present step 100 is repeatedly performed until it is determined that the Short-FFT result is input to the calculator 22. When the input of the Short-FFT result is determined, the routine proceeds to step 102.

In step 102, it is determined whether a FFT analytic result with regard to the Long-UP beat frequency "U" and the Long-DOWN beat frequency "D" is input to the calculator 22. Hereinafter the FFT analytic result is referred to as a Long-FFT result. The procedure of the present step 102 is repeatedly performed until it is determined that the Long-FFT result is input to the calculator 22. When the input of the Long-FFT result is determined, the routine proceeds to step 104.

In step 104, it is determined whether the IC control (Intelligent Cruise Control) mode or the TCC control (Traffic Congestion Cruise Control) mode is selected by a driver. When it is determined that either the IC control mode or the TCC control mode is selected, the routine proceeds to step 106. On the other hand, when it is determined that neither the IC control mode nor the TCC control mode is selected, the routine proceeds to step 108.

In step 106, a procedure for making the Long-FFT result precede the Short-FFT result is performed. When the procedure of the present step 106 is performed, the relative distance RD and the relative velocity RV are calculated based on the combination of (U, D) in a situation where both of the combinations of (U, D) and (u, d) are correctly detected.

On the other hand, in step 108, a procedure for making the Short-FFT result precede the Long-FFT result is performed. When the procedure of the present step 108 is performed, the relative distance RD and the relative velocity RV are calculated based on the combination of (u, d) in a situation where both of the combinations of (U, D) and (u, d) are correctly detected.

According to the radar system of the present embodiment, a detecting precision of the relative distance RD increases when the RD and the RV are calculated based on the (U, D) as compared to when the RD and the RV are calculated based on the (u, d). On the other hand, a detecting precision of the relative velocity RV increases when the RD and the RV are calculated based on the (u, d) as compared to when the RD and the RV are calculated based on the (U, D).

While either the IC control or the TCC control is being performed, it is required to control the relative distance RD between the vehicle and the target accurately. Thus, the detecting precision of the RD should precede the detecting precision of the RV in a situation where the IC control or the TCC control is performed. According to the procedure of step 106, it is possible to form a suitable situation for the IC control and the TCC control when the driver selects either of those controls.

While the CP control (Collision Preventing Control) is being performed, it is required to control the relative velocity RV accurately. Thus, the detecting precision of the RV should precede the detecting precision of the RD in a situation where the CP control is performed. According to the procedure of step 108, it is possible to form a suitable situation for the CP control when the driver selects neither the IC control nor the TCC control.

When the procedure of step 106 or 108 is finished, the routine proceeds to step 110.

In step 110, it is determined whether a plurality of targets is detected in either the Short-FFT result or the Long-FFT result. More particularly, it is determined whether more than two beat frequencies are detected in at least one of the first up period where the repeated frequency is fm, the first down period where the repeated frequency is fm, the second up period where the repeated frequency is 2fm and the second down period where the repeated frequency is 2fm.

When a number of the beat frequencies detected in each of those periods is "1" or "0", it is possible to recognize that a number of the targets existing ahead of the vehicle is one or less than one. In this case, the routine proceeds to step 112. On the other hand, when more than two beat frequencies are detected in at least one of those periods, it is possible to recognize that there are more than two targets ahead of the vehicle. In this case, the routine proceeds to step 114.

In step 112, the Long-UP frequency "U" and the Long-DOWN frequency "D" included in the Long-FFT result are memorized as the (U, D). Further, in this step 112, the Short-up frequency "u" and the Short-down frequency "d" included in the Short-FFT result are memorized as the (u, d). When the procedures discussed above are finished, the routine proceeds to step 113.

In step 113, a numeral "1" is applied to "n" and a numeral "1" is applied to "j". The "n" is a parameter for indicating a total number of the targets. The "j" is a parameter for indicating a number of performed data. When the procedures of the present step 113 is finished, the routine proceeds to step 122 shown in FIG. 9.

In step 114, procedures for making a plurality of combinations of beat frequencies (Ui, Di) and (ui, di) are performed ("i" means "1" through "n"). The combinations (Ui, Di)(i=1~n) are formed based on the Long-FFT result. The combinations (ui, di) (i=1~n) are formed based on the Short-FFT result. The procedures of the present step 114 are performed so that each of the combinations consists of beat frequencies that are caused by the same target. According to the procedure discussed above, the same number of combinations as the number of the targets existing ahead of the vehicle are made.

In step 116, a total number of the combinations that are made in the above step 114 is applied to "n", which indicates a total number of the targets existing ahead of the vehicle. Further, in step 116, a numeral "0" is applied to "j", which indicates a number of performed data.

In step 118, an increment procedure of "j" is performed. When the routine performs this step the first times a numeral "1" is applied to "j" in this step 118.

In step 120, combinations (Uj, Dj) and (uj, dj) among the plurality of the combinations (Ui, Di) and (ui, di) (i=1~n) are memorized as the combination of the "U" and the "D," i.e., (U, D) and the combination of the "u" and the "d," i.e., (u, d). When the procedures of the present step 120 are finished, the routine proceeds to step 122 shown in FIG. 9.

In steps below step 122, procedures for calculating the relative distance RD and the relative velocity RV of the target are performed based on the beat frequencies U, D, u and d corresponding to the targets.

In step 122, a procedure for comparing a number of pairs of the "U" and the "D" included in the Long-FFT result, and a number of pairs of the "u" and the "d" included in the Short-FFT result is performed.

As shown in FIG. 7, there is no pair of the "U" and the "D" in the areas G, I and T. On the other hand, a pair of the "u" and the "d" is indicated in all of the three areas G, I and T. Therefore, in a case where a target exists in one of the areas G, I and T, it is determined that the Short-FFT result includes more pairs than the Long-FFT result does in the above step 122. In this case, the routine proceeds to step 124.

In step 124, the relative distance RD and the relative velocity RV are calculated by applying the Short-up beat frequency "u" and the Short-down beat frequency "u" detected by the FFT circuit 24 to the above formulas (17) and (18). The present step 124 is performed when the target that is a subject of the routine exists in one of the three areas G, I and T. The FFT circuit 24 detects the "u" and the "d" correctly when the target exists in one of those areas as shown in FIG. 7 Therefore, according to the procedure of the present step 124, the RD and the RV are calculated accurately. When the procedure discussed above is finished, the routine proceeds to step 126.

In step 126, it is determined whether the number of the performed data, i.e., "j", is equal to the total number of the target, i.e., "n". When the condition j=n is satisfied, the routine is finished. On the other hand, when the condition j=n is not satisfied, the procedure of the above step 118 is performed again.

As shown in FIG. 7, there is no pair of the "u" and the "d" in the areas B, L, N, Q and V. On the other hand, a pair of the "U" and the "D" is indicated in all of the five areas B, L, N, Q and V. Therefore, in a case where a target exists in one of the areas B, L, N, Q and V, it is determined that the Long-FFT result includes more pairs than the Short-FFT result does in the above step 122. In this case, the routine proceeds to step 128 shown in FIG. 10.

In step 128, it is determined whether included in the Short-FFT result is only the Short-down beat frequency "d". Areas where the Short-FFT result includes only the "d" are identified as the areas B and V among the areas B, L, N, Q and V. Therefore, it is determined that the area where the target belongs to is area B or V, when the condition of the present step 128 is satisfied. In this cases the routine proceeds to step 130.

In step 130, a procedure for comparing the Long-UP beat frequency "U" and the Long-DOWN beat frequency "D" is performed. A target existing in the area B has an approaching relative velocity RV. The Long-UP beat frequency "U" is necessarily smaller than the Long-DOWN beat frequency "D" when the target has an approaching relative velocity RV. On the other hand, a target existing in the area V has a leaving relative velocity. The Long-UP beat frequency "U" is necessarily larger then the Long-DOWN beat frequency "D" when the target hash a leaving relative velocity RV.

Therefore, the area where the target exists is identified as the area B when it is determined that the condition of the step 130, i.e. U<D is satisfied. In this case, the routine proceeds to step 132. On the other hand, the area where the target exists is identified as the area, V when it is determined that the condition U<D is not satisfied. In this case, the routine proceeds to step 134.

In step 132, reversed frequency "–U" is calculated by reversing a sign of the Long-UP beat frequency "U" that is actually detected by the FFT circuit 24. Further, in the present step 132, the relative distance RD and the relative velocity RV are calculated by applying the reversed frequency "–U" and the Long-DOWN beat frequency "D" to the above formulas (11) and (12).

Above-mentioned step 132 is performed when the target of a subject of the present routine exists in the area B. As shown in FIG. 7, the FFT circuit 24 detects a Long-UP beat frequency "–U" having a wrong sign and a Long-DOWN beat frequency "D" having a correct sign in the area B. Therefore, according to the procedure of the present step 132, the relative distance RD and the relative velocity RV of the target are calculated correctly. When the procedure discussed above is finished, the routine proceeds to the above step 126.

In step 134, the relative distance RD and the relative velocity RV are calculated by applying the Long-UP beat frequency "U" and the Long-DOWN beat frequency "D" that are actually detected by the FFT circuit 24 to the above formulas (11) and (12). Step 134 is performed when the target of a subject of the present routine exists in the area V. As shown in FIG. 7, the FFT circuit 24 detects a Long-UP beat frequency "U" having a correct sign and a Long-DOWN beat frequency "D" having a correct sign in the area V. Therefore, according to the procedure of the present step 134, the relative distance RD and the relative velocity RV of the target are calculated correctly. When the procedure discussed above is finished, the routine proceeds to the above step 126.

When the condition of the above step 128 is not satisfied, it is determined that the Short-FFT result includes no beat frequency or includes only the Short-up beat frequency "u". In this case, the area where the target of a subject of the present routine exists is identified as one of the areas L, N and Q. When the above determination is performed in step 128, the routine proceeds to step 136.

In step 136, it is determined whether included in the Short-FFT result is only the Short-up beat frequency "u".

When the condition is not satisfied, it is determined that the Short-FFT result includes no beat frequency. An area where no beat frequency is detected in the Short-FFT result is only the area N among the areas L, N and Q. Therefore, the area where the target exists is identified as the area N when it is determined that the condition of the step 136 is not satisfied. In this case, the routine proceeds to the above step 134.

As shown in FIG. 7, the FFT circuit 24 detects a Long-UP beat frequency "U" having a correct sign and a Long-DOWN beat frequency "D" having a correct sign in the area V. Therefore, according to the procedure of the present step 136, the relative distance RD and the relative velocity RV of the target are calculated correctly.

When it is determined that the condition of step 136 is satisfied, the area where the target exists is identified as either the area L or the area Q. When the above determination is performed, the routine proceeds to step 138.

In step 138, a procedure for comparing the Long-UP beat frequency "U" and the Long-DOWN beat frequency "D" is performed. A target existing in the area L has an approaching relative velocity. Accordingly, the Long-UP beat frequency "U" is necessarily smaller than the Long-DOWN beat frequency "D" when the target exists in the area L. On the other hand, a target existing in the area Q has a leaving relative velocity. Accordingly, the Long-UP beat frequency "U" is necessarily larger than the Long-DOWN beat frequency "D" when the target exists in the area Q.

Therefore, the area where the target exists is identified as the area L when it is determined that the condition of the step 138, i.e. U<D is satisfied In this case, the routine proceeds to the above step 134. The FFT circuit 24 detects the Long-UP beat frequency "U" and the Long-DOWN beat frequency "D" correctly. Therefore, according to the procedure of the above step 134, the relative distance RD and the relative velocity RV of the target are calculated correctly.

On the other hand, the area where the target exists is identified as the area Q when it is determined that the condition U<D is not satisfied. In this case, the routine proceeds to step 140.

In step 140, a reversed frequency "−D" is calculated by reversing a sign of the Long-DOWN beat frequency "D" that is actually detected by the FFT circuit 24. Further, in the present step 134, the relative distance RD and the relative velocity RV are calculated by applying the Long-UP beat frequency "U" and the reversed frequency "−D" to the above formulas (11) and (12).

As shown in FIG. 7, the FFT circuit 24 detects a Long-UP beat frequency "U" having a correct sign and a Long-DOWN beat frequency "−D" having a wrong sign in the area Q. Therefore, according to the procedure of step 140, the relative distance RD and the relative velocity RV of the target are calculated correctly. When the procedure discussed above is finished, the routine proceeds to the above step 126.

When the number of pairs of (U, D) and the number of pairs of (u, d) are the same, both zero or one, the target exists in one of the areas A, C, D, E, F, H, J, K, M, O, P, R, U, W and X among the twenty-four areas shown in FIG. 7. Accordingly, it is possible to determine that the target exists in one of the above sixteen areas, when it is determined that the numbers of both pairs are the same in the above step 122. When the determination is performed, the routine proceeds to step 142.

In step 142, it is determined whether both of the number of the pairs detected in the Long-FFT result and the number of the pairs detected in the Short-FFT result are one. The FFT circuit 24 detects one pair of beat frequencies in the Long-FFT result and in the Short-FFT result, respectively, only when the target exists in one of the areas A, C, K, P and R among the above sixteen areas. Accordingly, it is possible to determine that the target exists in one of the areas A, C, K, P and R when the condition of step 142 is satisfied. In this case, the routine proceeds to step As shown in FIG. 7, the FFT circuit 24 detects a Long-UP beat frequency "−U" having a wrong sign, a Long-DOWN beat frequency "D" having a correct sign, a Short-up beat frequency "−u" having a wrong sign, a Short-down beat frequency "d" having a correct sign in the area A.

Figure 14A:
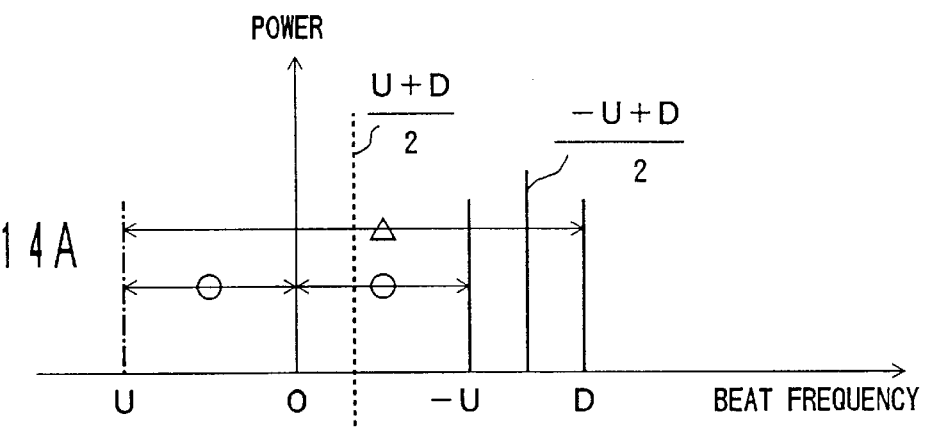
FIG. 14A is an example of a spectrum of a Long-DOWN beat frequency D having a correct sign and a Long-UP beat frequency "-U" having a wrong sign.
Figure 14B:
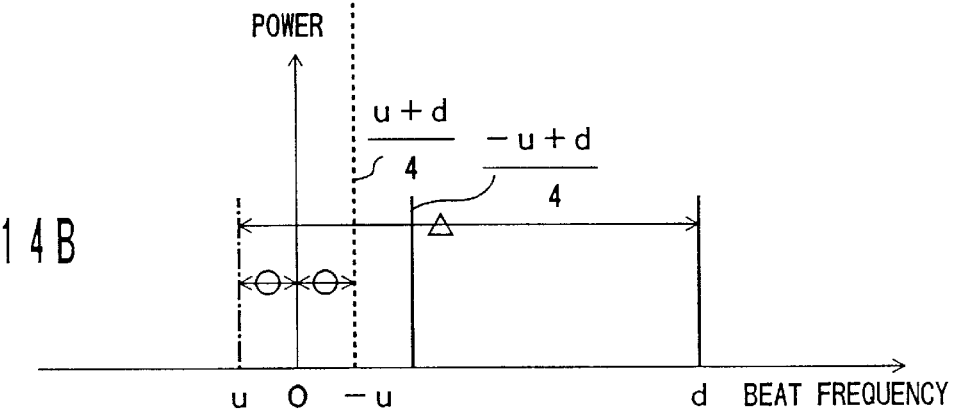
FIG. 14B is an example of a spectrum of a Short-down beat frequency d having a correct sign and a Short-up beat frequency "-u" having a wrong sign.

FIG. 14A shows an example of frequency spectrum data included in the Long-FFT result in a situation where a target exists in the area A. FIG. 14B shows an example of a frequency spectrum data included in the Short-FFT result in a situation where a target exists in the area A. Spectrums shown in FIG. 14A and FIG. 14B by chain lines indicate spectrums that accord to the Long-UP beat frequency "U" having a correct sign (negative sign) and the Short-up beat frequency "u" having a correct sign (negative sign). As discussed above, the FFT circuit 24 does not detect these spectrums.

As shown in the above formula (11) and (17), the relative distance RD is expressed as "RD=(D+U)/2α" by using the "U" and the "D" or expressed as "RD =(d+u)/2α" by using the "u" and the "d". Accordingly, beat frequencies "U", "D", "u" and "d" having a correct sign should satisfy a relationship indicated below.

$$(D+U)/2=(d+u)/4 \quad (31)$$

As shown in the above formulas (12) and (18), the relative velocity RV is expressed as "RV=(D−U)/2β" by using the "U" and the "D" or expressed as "RV =(d−u)/2β" by using the "u" and the "d". Accordingly, beat frequencies "U", "D", "u" and "d" having a correct sign should satisfy a relationship indicated below.

$$(D-U)=(d-u) \quad (32)$$

In FIG. 14A and FIG. 14B, the spectrums are indicated at points where the frequencies "U", "D","u" and "d" satisfy the conditions of the formulas (31) and (32).

When the Long-UP beat frequency "U" and the Short-up beat frequency "u" have a negative sign as shown in FIG. 14A and 14B, the FFT circuit 24 detects beat frequencies "−U" and "−u" having a wrong sign (positive sign). The frequencies "−U" and "−u" do not satisfy the condition of the above formula (31), namely, the frequencies "−U", "D", "−u" and "d" do not satisfy the condition "(D−U)/2=(d−u)/4". Therefore, when the frequencies "−U", "D", "−u" and "d" actually detected by the FFT circuit 24 are applied to the formulas (11) and (17), two kinds of relative distance RD are calculated by each of the formulas (11) and (17).

Further, the frequencies "−U" and "−u" do not satisfy the condition of the above formula (32), namely, the frequencies "−U", "D", "−u" and "d" do not satisfy the condition "{D−(−U)}={d−(−u)}". Therefore, when the frequencies "−U", "D", "−u" and "d" actually detected by the FFT circuit 24 are applied to the formulas (12) and (18), two kinds of relative velocity RV are calculated by each of the formulas (12) and (18).

As discussed above, two kinds of relative distance RD and two kinds of relative velocity RV are calculated based on the Long-FFT result and the Short-FFT result, respectively, when the target exists in the area A. Different relative distances RD and different relative velocities RV are calculated, based on the Long-FFT result and the Short-FFT result, when the target exists in the areas C, P and R, in the same manner as when the target exists in the area A.

The FFT circuit 24 detects the Long-UP beat frequency "U", the Long-DOWN beat frequency "D", the Short-up beat frequency "u" and the Short-down beat frequency, "d" correctly, when the target exists in the area K. Accordingly, the same relative distance RD and the same relative velocity RV are calculated based on the Long-FFT result and the Short-FFT result.

In step 144, it is determined whether the RD and the RV calculated based on the Long-UP FFT result are the same as the RD and the RV calculated based on the Short-FFT result. When it is determined that the condition of the present step 144 is satisfied, it is possible to determine that the target exists in the area K. In this case, the routine proceeds to step 146.

In step 146, it is determined whether a precedence mode of the Long-FFT result is selected by the procedure of step 106. When it is determined that the precedence mode of the Long-FFT result is selected, the routine proceeds to step 148. On the other hand, when it is determined that the precedence mode of the Long-FFT mode is not selected, the routine proceeds to step 150.

In step 148, the relative distance RD and the relative velocity RV are calculated by applying the pair of the long side beat frequencies (U, D) to the above formulas (11) and (12). According to the procedure of the present step 148, it is possible to calculate correctly the relative distance RD and the relative velocity RV of the target existing in the area K by making the detecting precision of the RD precede the detecting precision of the RV. When the procedure of the present step 148 is finished, the routine proceeds to the above step 126.

In step 150, the relative distance RD and the relative velocity RV are calculated by applying the pair of the short side beat frequencies (u, d) to the above formulas (11) and (12). According to the procedure of the present step 150, it is possible to calculate correctly the RD and the RV of the target existing in the area K by making the detecting precision of the RV precede the detecting precision of the RD. When the procedure of the present step 150 is finished, the routine proceeds to the above step 126.

In the present routines, it is possible that the target exists in one of areas A, C, P and R, when it is determined that different relative distances RD and different relative velocities RV are calculated based on the Long-FFT result and the Short-FFT result in the above step 144. In this case, the routine proceeds to step 152.

In step 152, a reversed frequency "–U" is calculated by reversing the sign of the Long-UP beat frequency "U". Further, in the present step 152, it is determined whether the RD and the RV calculated based on a pair of the reversed frequency "–U", and the Long-DOWN beat frequency "D" are the same as those calculated based on a pair of the short side beat frequencies (u, d).

When the target exists in the area C, the same relative distance RD and the same relative velocity RV are calculated by the above procedures. On the other hand, when the target exists in one of the areas A, P and R, the RD and the RV are calculated as different values by the above procedures. Accordingly, it is possible to determine that the target exists in the area C, when it is determined that the condition of the present step 152 is satisfied. In this case, the routine proceeds to step 154.

In step 154, it is determined whether a precedence mode of the Long-FFT result is selected by the procedure of step 106. When it is determined that the precedence mode of the Long-FFT result is selected, the routine proceeds to step 156. On the other hand, when it is determined that the precedence mode of the Long-FFT mode is not selected, the routine proceeds to step 158.

In step 156, the relative distance RD and the relative velocity RV are calculated by applying the pair of the reversed frequency "–U" and the Long-DOWN beat frequency "D" to the above formulas (11) and (12). According to the procedure of the present step 156, it is possible to calculate correctly the RD and the RV of the target existing in the area C, making the detecting precision of the RD precede the detecting precision of the RV. When the procedure of the present step 156 is finished, the routine proceeds to the above step 126.

In step 158, the relative distance RD and the relative velocity RV are calculated by applying the pair of the short side beat frequencies (u, d) to the above formulas (11) and (12). According to the procedure of the present step 158, it is possible to calculate correctly the RD and the RV of the target existing in the area C, making the detecting precision of the RV precede the detecting precision of the RD. When the procedure of the present step 158 is finished, the routine proceeds to the above step 126.

In the present routine, it is possible to determine that the target exists in one of the areas A, P and R, when it is determined that the RD and the RV calculated based on the (–U, D) and the (u, d) are not the same in the above step 152. When the determination is performed, the routine proceeds to step 160 shown in FIG. 11.

In step 160, reversed frequencies "–U" and "–u" are calculated by reversing the sign of the Long-UP beat frequency "U" and the Short-up beat frequency "u". Further, in the present step 160, it is determined whether the RD and the RV calculated based on a pair of the reversed frequency "–U" and the Long-DOWN beat frequency "D" are the same as those calculated based on a pair of the reversed frequency "–u" and the Short-down beat frequency "D".

When the target exists in the area A, the same relative distance RD and the same relative velocity RV are calculated by the above procedures. On the other hand, when the target exists in either the area P or the area R, the RD and the RV are calculated as different values by the above procedures. Accordingly, it is possible to determine that the target exists in the area A, when it is determined that the condition of the present step 160 is satisfied. In this case, the routine proceeds to step 162.

In step 162, it is determined whether a precedence mode of the Long-FFT result is selected by the procedure of step 106. When it is determined that the precedence mode of the Long-FFT result is selected, the routine proceeds to step 164. On the other hand, when it is determined that the precedence mode of the Long-FFT mode is not selected, the routine proceeds to step 166.

In step 164, the relative distance RD and the relative velocity RV are calculated by applying the pair of the reversed frequency "–U" and the Long-DOWN beat frequency "D" to the above formulas (11) and (12). According to the procedure of the present step 164, it is possible to calculate correctly the RD and the RV of the target existing in the area A by making the detecting precision of the RD precede the detecting precision of the RV. When the procedure of the present step 164 is finished, the routine proceeds to the above step 126.

In step 166, the relative distance RD and the relative velocity RV are calculated by applying the pair of the reversed frequency "–u" and the Short-down beat frequency "d" to the above formulas (11) and (12). According to the procedure of the present step 166, it is possible to calculate correctly the RD and the RV of the target existing in the area A by making the detecting precision of the RV precede the detecting precision of the RD. When the procedure of the present step 166 is finished, the routine proceeds to the above step 126.

In the present routine, it is possible to determine that the target exists in either the area P or the area R, when it is determined that the RD and the RV calculated based on the (−U, D) and the (−u, d) are not the same in the above step 160. When the determination is performed, the routine proceeds to step 168.

In step 168, a reversed frequency "−D" is calculated by reversing the sign of the Long-DOWN beat frequency "D". Further, in the present step 168, it is determined whether the RD and the RV calculated based on a pair of the Long-UP beat frequency "U" and the reversed frequency "−D" are the same as those calculated based on a pair of the short side beat frequencies (u, d).

When the target exists in the area R, the same relative distance RD and the same relative velocity RV are calculated by the above procedures. On the other hand, when the target exists in the area P, the RD and the RV are calculated as different values by the above procedures. Accordingly, it is possible to determine that the target exists in the area R, when it is determined that the condition of the present step 168 is satisfied. In this case, the routine proceeds to step 170.

In step 170, it is determined whether a precedence mode of the Long-FFT result is selected by the procedure of step 106. When it is determined that the precedence mode of the Long-FFT result is selected, the routine proceeds to step 172. On the other hand, when it is determined that the precedence mode of the Long-FFT mode is not selected, the routine proceeds to step 174.

In step 172, the relative distance RD and the relative velocity RV are calculated by applying the pair of the Long-UP beat frequency "U" and the reversed frequency "−D" to the above formulas (11) and (12). According to the procedure of the present step 172, it is possible to calculate correctly the RD and the RV of the target existing in the area R by making the detecting precision of the RD precede the detecting precision of the RV. When the procedure of the present step 172 is finished, the routine proceeds to the above step 126.

In step 174, the relative distance RD and the relative velocity RV are calculated by applying the pair of the short side beat frequencies (u, d) to the above formulas (11) and (12). According to the procedure of the present step 174, it is possible to calculate correctly the RD and the RV of the target existing in the area R by making the detecting precision of the RV precede the detecting precision of the RD. When the procedure of the present step 174 is finished, the routine proceeds to the above step 126.

In the present routine, it is possible to determine that the target exists in the area P, when it is determined that the RD and the RV calculated based on the (U, −D) and the (u, d) are not the same in the above step 168. When the determination is performed, the routine proceeds to step 176.

In step 176, it is determined whether a precedence mode of the Long-FFT result is selected by the procedure of step 106. When it is determined that the precedence mode of the Long-FFT result is selected, the routine proceeds to step 178. On the other hand, when it is determined that the precedence mode of the Long-FFT mode is not selected, the routine proceeds to step 180.

In step 178, the relative distance RD and the relative velocity RV are calculated by applying the pair of the Long-UP beat frequency "U" and the reversed frequency "−D" to the above formulas (11) and (12). According to the procedure of the present step 178, it is possible to calculate correctly the RD and the RV of the target existing in the area P by making the detecting precision of the RD precede the detecting precision of the RV. When the procedure of the present step 178 is finished, the routine proceeds to the above step 126.

In step 180, a reversed frequency "−d" is calculated by reversing the sign of the Short-down beat frequency "d". Further, in the present step 180, the relative distance RD and the relative velocity RV are calculated by applying the pair of the Short-up beat frequency "u" and the reversed frequency "−d" to the above formulas (11) and (12). According to the procedure of the present step 180, it is possible to calculate correctly the RD and the RV of the target existing in the area P by making the detecting precision of the RV precede the detecting precision of the RD. When the procedure of the present step 180 is finished, the routine proceeds to the above step 126.

In the areas D, E, F, J, M, O, S, U, W and X among the sixteen areas where the same number of pairs is detected in both of the Long-FFT result and the Short-FFT result, the number of the pairs is zero. Accordingly, it is possible to determine that the target exists in one of the areas D, E, F, H, E, J, M, O, S, U, W and X, when it is determined that the number of the pairs detected in the Long-FFT result and the Short-FFT result is not one in the above step 142. In this case, the routine proceeds to step 182 shown in FIG. 12.

In step 182, it is determined whether there is no spectrum in both of the Long-FFT result and the Short-FFT result. The FFT circuit 24 detects no spectrum when there is no target ahead of the vehicle and when a target exists only in the area D. Accordingly, it is possible to determine that there is no target ahead of the vehicle or a target exists in the area D, when it is determined that the condition of the present step 182 is satisfied.

In step 184, it is determined whether a target that was recognized in the area E or G during the last cycle of the present routine has disappeared. Targets existing in the area F do not go into the area D when having a leaving relative velocity. Thus, targets can go into the area D only by approaching from the areas E or G. Accordingly, it is determined that there is no target in the area D, namely, there is no target ahead of the vehicle, when the condition of the present step 184 is not satisfied. In this case, the routine proceeds to the above step 126. On the other hand, it is determined that the target exists in the area D, when it is determined that the target that was recognized in the area E or F disappears. In this case, the routine proceeds to step 186.

In step 186, the relative distance RD and the relative velocity RV of the target are estimated based on a relative distance RD0 and a relative velocity RV0, which the target had before disappearing from the area E or F. More particularly, the relative velocity RV is estimated to be equal to the RV0. Further, the relative distance RD is estimated by subtracting a product Δt·RV0 from the RD0 (RD=RD0−Δt·RV0), when Δt is a passing time after the disappearances. When the procedures of the present step 186 are finished, the routine proceeds to the above step 126.

In the present routine, it is possible to determine that the target exists in one of the areas E, F, H, J, M, O, S, U, W and X, when it is determined that at least one spectrum is included in the Long-FFT result or the Short-FFT result in the above step 182. When the determination is performed, the routine proceeds to step 188.

In step 188, it is determined whether the FFT circuit 24 detects only the Short-down beat frequency "d". The area E is the only one where the FFT circuit 24 detects only the Short-down beat frequency "d" among the twenty-four areas. Accordingly, it is possible to determine that the target exists in the area E when the condition of the present step 188 is satisfied. In this case, the routine proceeds to step 190.

In step 190, the Short-up beat frequency "u" is estimated. Targets go into the area E by approaching from one of the areas H, I and G. As shown in FIG. 7, a pair of the short side beat frequencies (u, d) is detected in the areas I and G. Further, as discussed below, the present routine estimates the Short-up beat frequency "u" when the target exists in the area H. Therefore, it is always possible to detect a difference between the "u" and the "d" when the target exists in one of the areas H, I and G.

The difference Δf between the "u" and the "d" does not change while the relative velocity RV is constant. The procedure of the step 190 is performed assuming that the target goes into the area E from one of the areas H, I and G keeping the relative velocity constant, namely, keeping the difference Δf constant. More particularly, in step 190, the "u" is estimated by subtracting the Δf detected before the target goes into the area E from the "d" detected after the target goes into the area E (u=d−Δf). When the procedure discussed above is finished, the routine proceeds to step 192.

In step 192, the relative distance RD and the relative velocity RV are calculated by applying the Short-down beat frequency "d" actually detected by the FFT circuit 24 and the Short-up beat frequency "u" estimated by the procedure of step 190 to the above formulas (11) and (12). According to the procedure of the present step 192, it is possible to calculate correctly the RD and the RV of the target existing in the area E. When the procedures of the present step 192 are finished, the routine proceeds to the above step 126.

In the present routine, it is possible to determine that the target exists in one of the areas F, H, J, H, O, S, U, W and X, when it is determined that the FFT circuit 24 detects any beat frequency but the "d" in the above step 188. In this cases the routine proceeds to step 194.

In step 194, it is determined whether the FFT circuit 24 detects only the Short-up beat frequency "u". The area F is the only one where the FFT circuit 24 detects only the Short-up beat frequency "u" among the twenty-four areas. Accordingly, it is possible to determine that the target exists in the area F when the condition of the present step 194 is satisfied. In this case, the routine proceeds to step 196.

In step 196, an existence of a target is recognized. A target goes into the area F by leaving from the area D, where the FFT circuit 24 detects no beat frequency. According to the radar system of the present embodiment, it is difficult to estimate correctly the Short-down beat frequency "d" after the target goes into the area F. Therefore, as discussed above, only a procedure for recognizing the existence of the target is performed in the present step 196. When the procedure is finished, the routine proceeds to the above step 126.

In the present routine, it is possible to determine that the target exists in one of the areas H, J, M, O, S, U, W and X, when it is determined that the FFT circuit 24 detects any beat frequency but the "u" in the above step 194. In this case, the routine proceeds to step 198.

In step 198, it is determined whether the FFT circuit 24 detects only the Long-DOWN beat frequency "D". The area X is the only one where the FFT circuit 24 detects only the Long-DOWN beat frequency "D" among the twenty-four areas. Accordingly, it is possible to determine that the target exists in the area X when the condition of the present step 198 is satisfied. In this cases the routine proceeds to step 200.

In step 200, the Long-UP beat frequency "U" is estimated. Targets go into the area X by leaving from one of the areas N, V and W. As shown in FIG. 7, a pair of the long side beat frequencies (U, D) is detected in the areas N and V. Further, as discussed below, the present routine estimates the Long-UP beat frequency "U" when the target exists in the area W. Therefore, it is always possible to detect a difference between the "U" and the "D" when the target exists in one of the areas N, V and W.

The difference Δf between the "U" and the "D" do not change while the relative velocity RV is constant. The procedure of the step 200 is performed assuming that the target goes into the area X from one of the areas N, V and W keeping the relative velocity constant, namely, keeping the difference Δf constant. More particularly, in step 200, the "U" is estimated by adding the Δf detected before the target goes into the area X to the "D" detected after the target goes into the area X (U =D+Δf). When the procedure discussed above is finished, the routine proceeds to step 202.

In step 202, the relative distance RD and the relative velocity RV are calculated by applying the Long-down beat frequency "D" actually detected by the FFT circuit 24 and the Long-UP beat frequency "U" estimated by the procedure of step 200 to the above formulas (11) and (12). According to the procedure of the present step 202, it is possible to calculate correctly the RD and the RV of the target existing in the area X. When the procedures of the present step 202 are finished, the routine proceeds to the above step 126.

In the present routine, it is possible to determine that the target exists in one of the areas H, J, M, O, S, U and W, when it is determined that the FFT circuit 24 detects any beat frequency but the "D" in the above step 198. In this case, the routine proceeds to step 204.

In step 204, it is determined whether the FFT circuit 24 detects only the Long-UP beat frequency "U". The area O is the only one where the FFT circuit 24 detects only the Long-UP beat frequency "U" among the twenty-four areas. Accordingly, it is possible to determine that the target exists in the area O when the condition of the present step 204 is satisfied. In this case, the routine proceeds to step 206.

In step 206, an existence of a target is recognized. A target goes into the area O by approaching from out of the target dynamic range of the radar system. According to the radar system of the present embodiment, it is difficult to estimate correctly the Long-DOWN beat frequency "D" after the target goes into the area O. Therefore, as discussed above, only a procedure for recognizing the existence of the target is performed in the present step 206. When the procedure is finished, the routine proceeds to the above step 126.

In the present routine, it is possible to determine that the target exists in one of the areas H, J, M, S, U and W, when it is determined that the FFT circuit 24 detects any beat frequency but the "U" in the above step 204. In this case, the routine proceeds to step 208 shown in FIG. 13.

In step 208, it is determined whether the FFT circuit 24 detects a combination of the Long-DOWN beat frequency "D" and the Short-down beat frequency "d". Areas where the FFT circuit 24 detects the combination of the "D" and the "d" are identified as the areas H and W among the areas H, J, M, S, U and W. Accordingly, it is possible to determine that the target exists in either the area H or the area W when the condition of the present step 208 is satisfied. In this case, the routine proceeds to step 210.

In step 210, it is determined whether a target that was recognized in the area I during the last cycle of the present routine has disappeared. A target goes into the area H only by approaching from the area I. Accordingly, it is determined that the target exists in the area H, when it is determined that the condition of the present step 210 is satisfied. In this case, the routine proceeds to step 212.

In step 212, the Short-up beat frequency "u" is estimated. It is necessary to provide a pair of beat frequencies (U, D) or (u, d) to calculate the RV and the RD. The FFT circuit 24 detects the "D" and the "d" when the target exists in the area E as shown in FIG. 7. Thus, when the target exists in the area H, it is possible to provide the pair of beat frequencies by estimating either the "U" or the "u".

However, the FFT circuit 24 detects a pair of short side beat frequencies (u, d) while detecting only the "D" of a pair of long side beat frequencies (U, D), when the target exists in the area I from where the target goes into the area H. The radar system estimates a beat frequency that has disappeared from the FFT results based on a pair of beat frequencies (U, D) or (u, d) detected just before the disappearance. Therefore, it is easier to estimate the "u" than to estimate the "U" when the target exists in the area H. Accordingly, as discussed above, the Short-up beat frequency "u" is estimated by the procedure of step 212.

The procedure of step 212 is performed assuming that the target keeps the relative velocity constant, namely, the target keeps the difference Δf between the "u" and the "d" constant. More particularly, in the above step 212, the Short-up beat frequency "u" is estimated by subtracting the difference Δf detected while the target exists in the area I from the "d" detected after the target goes into the area H (u=d−Δf). When the procedures discussed above are finished the routine proceeds to step 214.

In step 214, the relative distance RD and the relative velocity RV are calculated by applying the Short-down beat frequency "d" actually detected by the FFT circuit 24 and the Short-up beat frequency "u" estimated by the procedure of step 212 to the above formulas (11) and (12). According to the procedure of the present step 214, it is possible to calculate correctly the RD and the RV of the target existing in the area H. When the procedures of the present step 212 are finished the routine proceeds to the above step 126.

In the present routine, it is possible to determine that the target exists in the area W, when it is determined that the target that was recognized in the area I has not disappeared in the above step 210. In this case, the routine proceeds to step 216.

In step 216, the Long-UP beat frequency "U" is estimated. A target goes into the area W by leaving from the area V. As shown in FIG. 7, the FFT circuit 24 detects a pair of long side beat frequencies (U, D) when the target exists in the area V. Thus, when the target exists in the area W, it is easier to estimate the Long-UP beat frequency "U" than to estimate the Short-up beat frequency "u". Accordingly, as discussed above, the Long-UP beat frequency "U" is estimated in the present step 216.

The procedure of step 216 is performed assuming that the target keeps the relative velocity constant, namely, the target keeps the difference Δf between the "u" and the "d" constant. More particularly, in the above step 216, the Long-UP beat frequency "U" is estimated by adding the difference Δf detected while the target exists in the area V to the "D" detected after the target goes into the area W (U=D+Δf). When the procedures discussed above are finished the routine proceeds to step 218.

In step 218, the relative distance RD and the relative velocity RV are calculated by applying the Long-DOWN beat frequency "D" actually detected by the FFT circuit 24 and the Long-UP beat frequency "U" estimated by the procedure of step 216 to the above formulas (11) and (12). According to the procedure of the present step 218, it is possible to calculate correctly the RD and the RV of the target existing in the area W. When the procedure of the present step 218 is finished the routine proceeds to the above step 126.

In the present routine, it is possible to determine that the target exists in one of the areas J, M, S and U when it is determined that the FFT circuit 24 detects any beat frequency but a combination of "D" and "d" in the above step 208. In this case, the routine proceeds to step 220.

In step 220, it is determined whether the FFT circuit 24 detects a combination of the Long-UP beat frequency "U" and the Short-up beat frequency "u". Areas where the FFT circuit 24 detects the combination of the "U" and the "u" are identified as the areas M and S among the areas J, E, S and U. Accordingly, it is possible to determine that the target exists in either the area M or the area S when the condition of the present step 220 is satisfied. In this case, the routine proceeds to step 222.

In step 222, it is determined whether a target that was recognized in the area O during the last cycle of the present routine has disappeared. A target goes into the area M by approaching from the area O. Accordingly, it is determined that the target exists in the area M, when it is determined that the condition of the present step 222 is satisfied. In this case, the routine proceeds to step 224.

In step 224, an existence of a target is recognized. According to the radar system of the present embodiment, it is difficult to estimate correctly the beat frequencies "D", "u" and "d", which the FFT circuit 24 does not detect. Accordingly, it is difficult to estimate the beat frequencies "D" or "d" corresponding to the target coming into the area M from the area O. Therefore, in the present step 224, only a procedure for recognizing the existence of the target is performed as discussed above. When the procedure discussed above is finished, the routine proceeds to the above step 126.

In the present routine, it is possible to determine that the target exists in the area S, when it is determined that the target recognized in the area O has not disappeared in the above step 222. In this case, the routine proceeds to step 226.

In step 226, it is determined whether a target that was recognized in the area Q during the last cycle of the present routine has disappeared. A target goes into the area S by leaving from the area Q or the area F. Accordingly, it is determined that the target comes from the area F, when it is determined that the condition of the present step 222 is not satisfied.

As discussed above, when a target exists in the area F, a procedure for recognizing an existence of the target is performed in the above step 196. Accordingly, it is difficult to estimate correctly beat frequencies that the FFT circuit 24 does not detect in a case where the target comes in the area S from the area F. Therefore, the routine proceeds to the above step 224 in which only the procedure for recognizing the target is performed next to step 226 when it is determined that the target comes in the area S from the area F.

On the other hand, it is possible to determine that the target comes in the area S from the area Q when it is determined that the target recognized in the area Q has disappeared. In this case, the routine proceeds to step 228.

In step 228, the Long-DOWN beat frequency "D" is estimated. As shown in FIG. 7, the FFT circuit 24 detects a combination of the Long-UP beat frequency "U" having a correct sign and the Long-DOWN beat frequency "−D" having a wrong sign when the target exists in the area Q. Thus, when the target comes in the area S from the area Q, it is easier to estimate the Long-DOWN beat frequency "D" than to estimate the Short-down beat frequency "d". Accordingly, as discussed above, the Long-DOWN beat frequency "D" is estimated in the present step 228.

The procedure of step 228 is performed assuming that the target keeps the relative velocity constant, namely, the target keeps the difference Δf, i.e. "U−(−D)" constant. More particularly, in the above step 228, the Long-DOWN beat frequency "D" is estimated by subtracting the difference Δf detected while the target exists in the area S from the "U" detected after the target comes in the area S (D=U−Δf). When the procedures discussed above are finished the routine proceeds to step 230.

In step 230, the relative distance RD and the relative velocity RV are calculated by applying the Long-UP beat frequency "U" actually detected by the FFT circuit 24 and the Long-DOWN beat frequency "D" estimated by the procedure of step 228 to the above formulas (11) and (12). According to the procedure of the present step 230, it is possible to calculate correctly the RD and the RV of the target existing in the area S. When the procedure of the present step 230 is finished the routine proceeds to the above step 126.

In the present routine, it is possible to determine that the target exists in either the area J or the area U when it is determined that the FFT circuit 24 detects any beat frequency but a combination of "U" and "u" in the above step 220. In this case, the routine proceeds to step 232.

In step 232, it is determined whether the FFT circuit 24 detects a combination of the Long-DOWN beat frequency "D" and the Short-up beat frequency "u". Areas where the FFT circuit 24 detects the combination of the "U" and the "u" are identified as the area J among the areas J and U. Accordingly, it is possible to determine that the target exists in the area J when the condition of the present step 232 is satisfied. In this case, the routine proceeds to step 234.

In step 234, the Long-UP beat frequency "U" is estimated. A target goes into the area J by approaching from the area L. As shown in FIG. 7, the FFT circuit 24 detects a pair of long side frequencies (U, D) when the target exists in the area L. Thus, in a case where the target exists in the area J, it is easier to estimate the Long-UP beat frequency "U" than to estimate the Short-down beat frequency "d". Accordingly, as discussed above, the Long-UP beat frequency "U" is estimated in the present step 234.

The procedure of step 234 is performed assuming that the target keeps the relative velocity constant, namely, the target keeps the difference Δf between the "U" and the "D" constant. More particularly, in the above step 234, the Long-UP beat frequency "U" is estimated by adding the difference Δf detected while the target exists in the area L to the "D" detected after the target goes into the area J (U=D+Δf). When the procedures discussed above is finished the routine proceeds to the above step 230. According to the procedures discussed above, it is possible to calculate correctly the RD and the RV of the target existing in the area J.

In the present routine, it is possible to determine that the target exists in the area U when it is determined that the beat frequencies detected by the FFT circuit 24 are not the "D" and the "u" in the above step 232. In this case, the routine proceeds to step 236.

In step 236, the Short-down beat frequency "d" is estimated. A target goes into the area U by leaving from the area R or T. As shown in FIG. 7, the FFT circuit 24 detects a pair of short side beat frequencies (u, d) when the target exists in either the area R or the area T. Thus, in a case where the target exists in the area U, it is easier to estimate the Short-up beat frequency "u" than to estimate the Long-DOWN beat frequency "D". Accordingly, as discussed above, the Short-up beat frequency "u" is estimated in the present step 236.

More particularly, in the above step 236, the Short-up beat frequency "u" is estimated by adding the difference Δf detected while the target exists in the area R or T to the "d" detected after the target goes into the area U (u=d+Δf). When the procedures discussed above are finished the routine proceeds to step 238.

In step 238, the relative distance RD and the relative velocity RV are calculated by applying the Short-down beat frequency "d" actually detected by the FFT circuit 24 and the Short-up beat frequency "u" estimated by the procedure of step 236 to the above formulas (11) and (12). According to the procedure of the present step 238, it is possible to calculate correctly the RD and the RV of the target existing in the area U. When the procedure of the present step 238 is finished the routine proceeds to the above step 126.

As discussed above, the radar system detects the relative distance and the relative velocity of the target correctly, not only while the target exists in the areas where the FFT circuit 24 detects the pair of the short side beat frequencies "u" and "d" or the pair of the long side beat frequencies "U" and "D" but also while the target exists in the areas where the FFT circuit 24 detects neither pairs. Accordingly, the radar system provides the target dynamic range, which is required for the IC control, the TCC control and the CP control.

As discussed above, the combination of the long side beat frequencies (U, D) detected by the FFT circuit 24 changes corresponding to which area the target exists in among the areas I~XIII shown in FIG. 5. Further, the combination of the short side beat frequencies (u, d) detected by the FFT circuit 24 changes corresponding to which area the target exists in among the areas i~xiii shown in FIG. 6. Moreover, the radar system detects the relative distance RD and the relative velocity RV using the fact that the areas I~XIII and the areas i~xiii are not the same as each other. Accordingly, it is necessary to make the areas I~XIII and the areas i~xiii different each other for detecting the RD and the RV by the radar system.

The radar system generates the long side beat frequencies (U, D) and the short side beat frequencies (u, d) by changing the repeated frequency of the modulated frequency F between fm and 2fm. According to the above procedure, it is possible to make the areas I~XIII shown in FIG. 5 and the areas i~xiii shown in FIG. 6 different, by changing the slant of the formulas (19)~(24) and that of the formulas (25)~(30).

However, a method for making the areas I~XIII and the areas i~xiii different is not limited to the method discussed above. Namely, the slant of the formulas (19)~(24) that separate the areas I~XIII shown in FIG. 5 is expressed as "±α/β". As discussed above, α and β are expressed as (4ΔF·fm/c0) and (2f0/c0), respectively.

Therefore, it is also possible to change the slant of the formulas (19)~(24), i.e. ±α/β=(2ΔF·fm/f0) by changing the ΔF or the f0. Accordingly, it is also possible to detect the RD and the RV by the radar system by generating the long side beat frequencies (U, D) and the short side beat frequencies (u, d) by changing the changing width ΔF of the modulated frequency F or changing the middle frequency f0 of the modulated frequency F.

As shown in step 186, the radar system of the present embodiment calculates the RV and the RD based on the RD0, the RV0 and the Δt when the target exists in the area D. Further, the radar system calculates the RV and the RD based on a pair of a detected beat frequency and an estimated beat frequency when the target exist in areas (except area D)

where the FFT circuit 24 detects neither a pair of long side beat frequencies (U, D) nor a pair of short side beat frequencies (u, d) as shown in such steps as 192 and 202. However, the present invention is not limited to the above embodiment, but it is possible to calculate the RD and the RV in the same manner as the procedure of step 186 in a case where the target exists in any area but D.

In the following, a second embodiment of the present invention will be described with reference to FIG. 15 through FIG. 17. The radar system of the present embodiment has the same system as shown in FIG. 1. In the radar system of the present embodiment, the calculator 22 performs a routine shown in FIG. 16 instead of the routine shown in FIG. 8.

FIG. 15 shows a time chart for explaining operation timing of the radar system of the first embodiment discussed above. More particularly, FIG. 15A and FIG. 15B show timing when the FFT circuit 24 detects the Short-FFT result and the Long-FFT result, respectively. FIG. 15C shows timing when the calculator 22 calculates the relative distance RD and the relative velocity RV.

As shown in FIG. 15A through FIG. 15C, the radar system of the first embodiment calculates the relative distance RD and the relative velocity RV whenever a pair of the Short-FFT result and the Long-FFT result is detected. Accordingly, the radar system of the first embodiment calculates the RD and the RV every 100 msec.

Necessary time for calculating the RD and the RV is much shorter than the necessary time for detecting the Short-FFT result or the Long-FFT result, i.e. 50 msec. Therefore, the calculator 22 can perform the calculation whenever either the Short-FFT result or the Long-FFT result is finished, namely every 50 msec.

Figure 8:
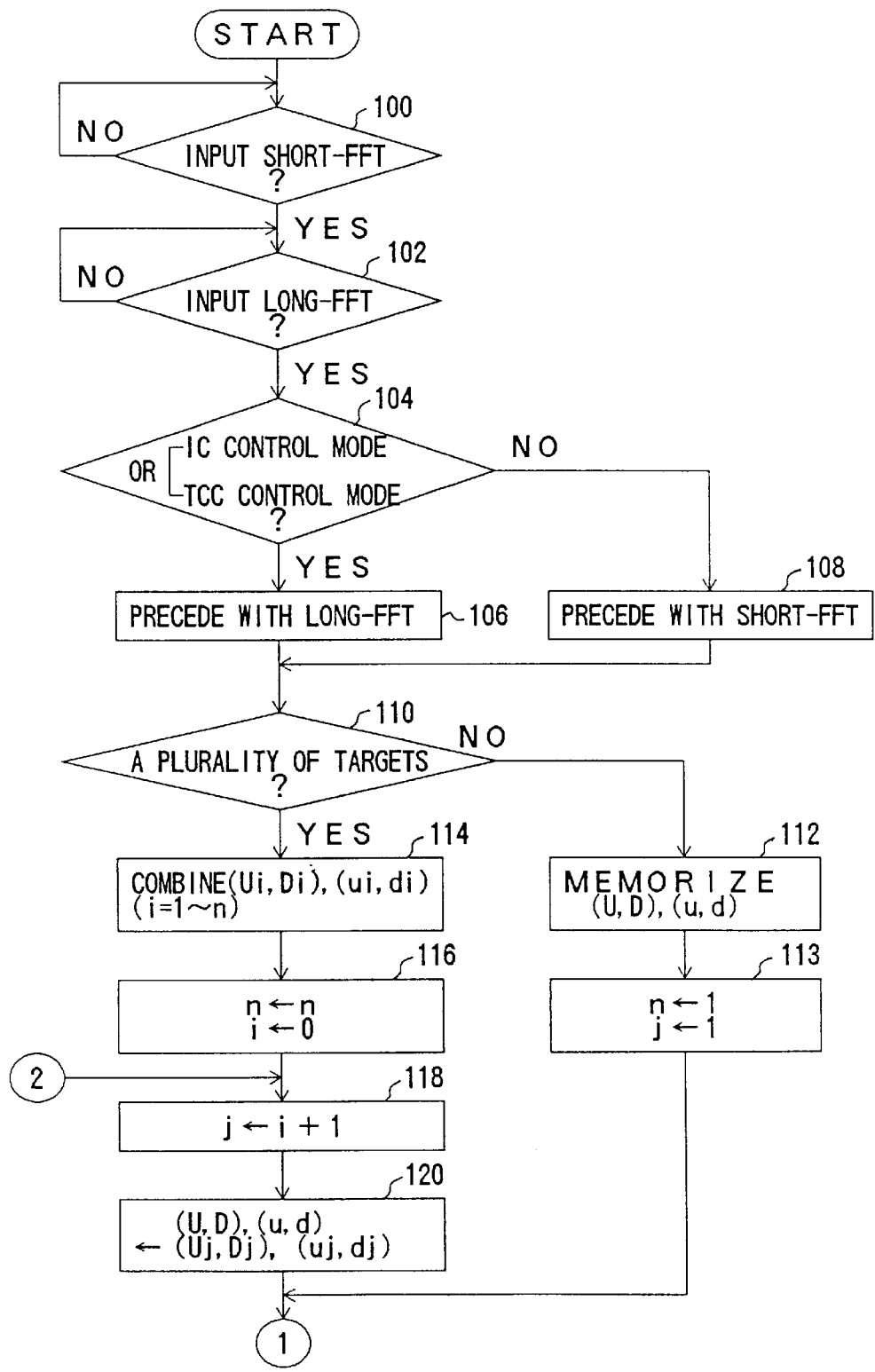
FIG. 8 is a first part of a flowchart of a routine performed by the radar system of the first embodiment.
Figure 9:
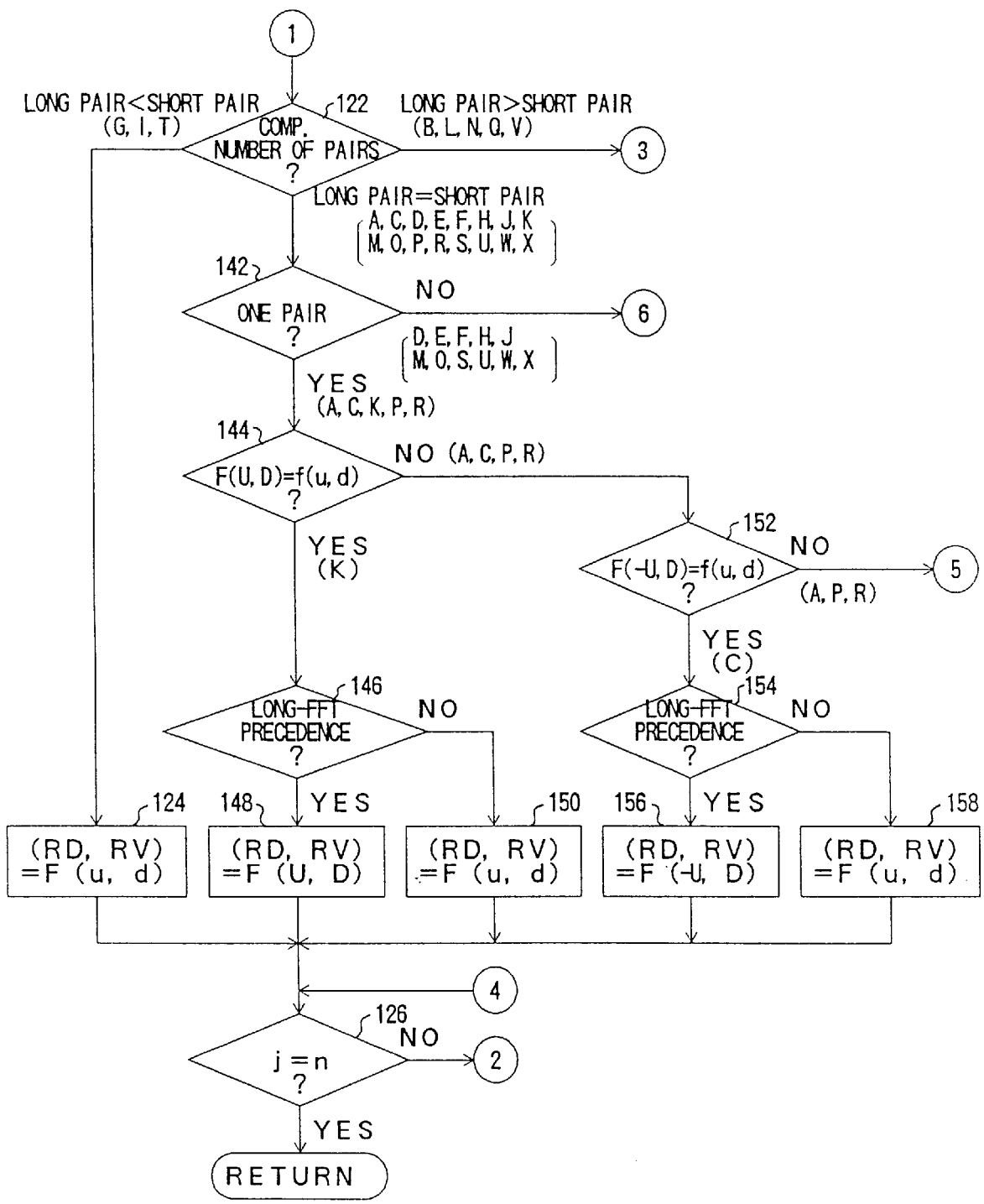
FIG. 9 is a second part of a flowchart of a routine performed by the radar system of the first embodiment.
Figure 10:
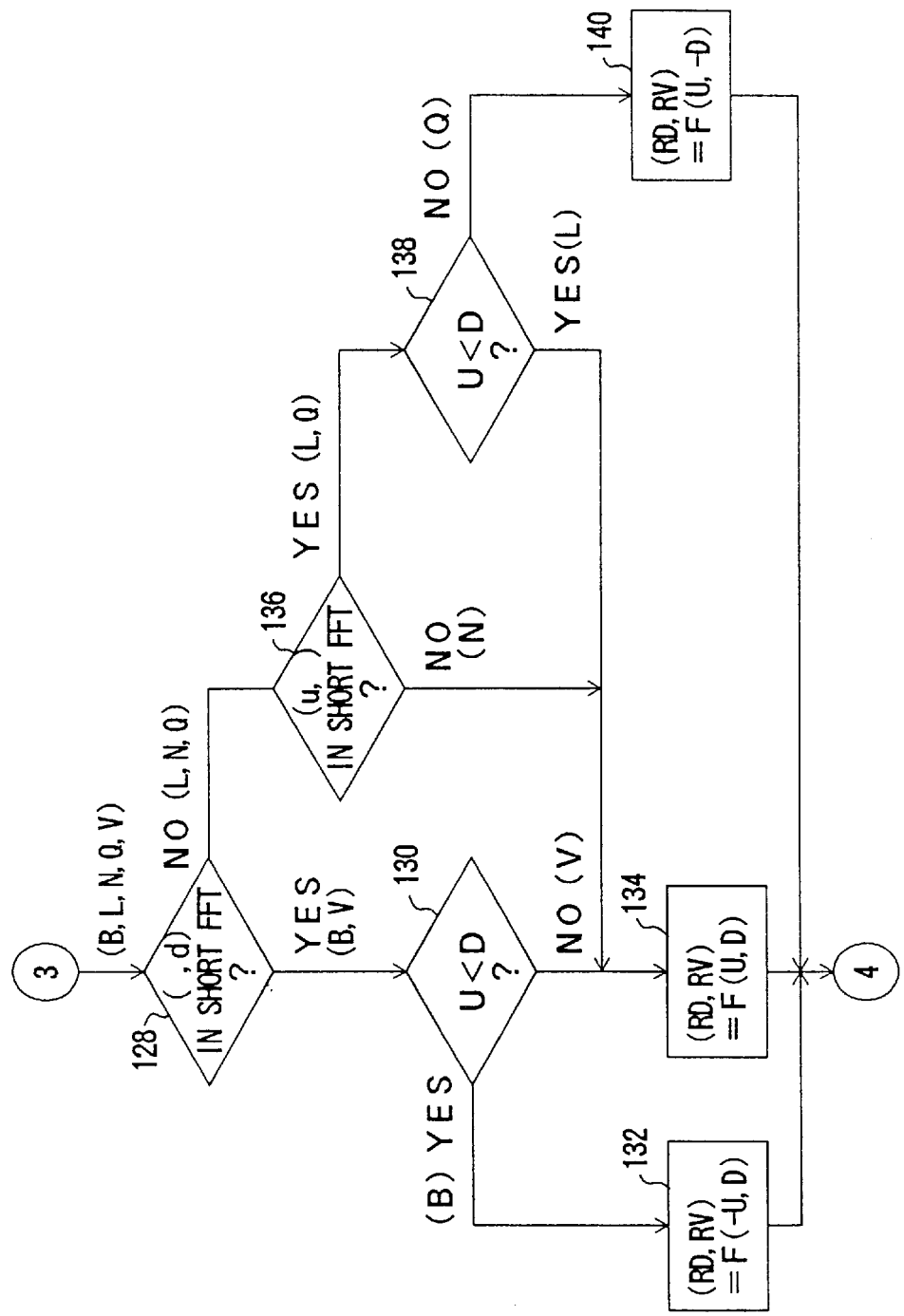
FIG. 10 is a third part of a flowchart of a routine performed by the radar system of the first embodiment.
Figure 11:
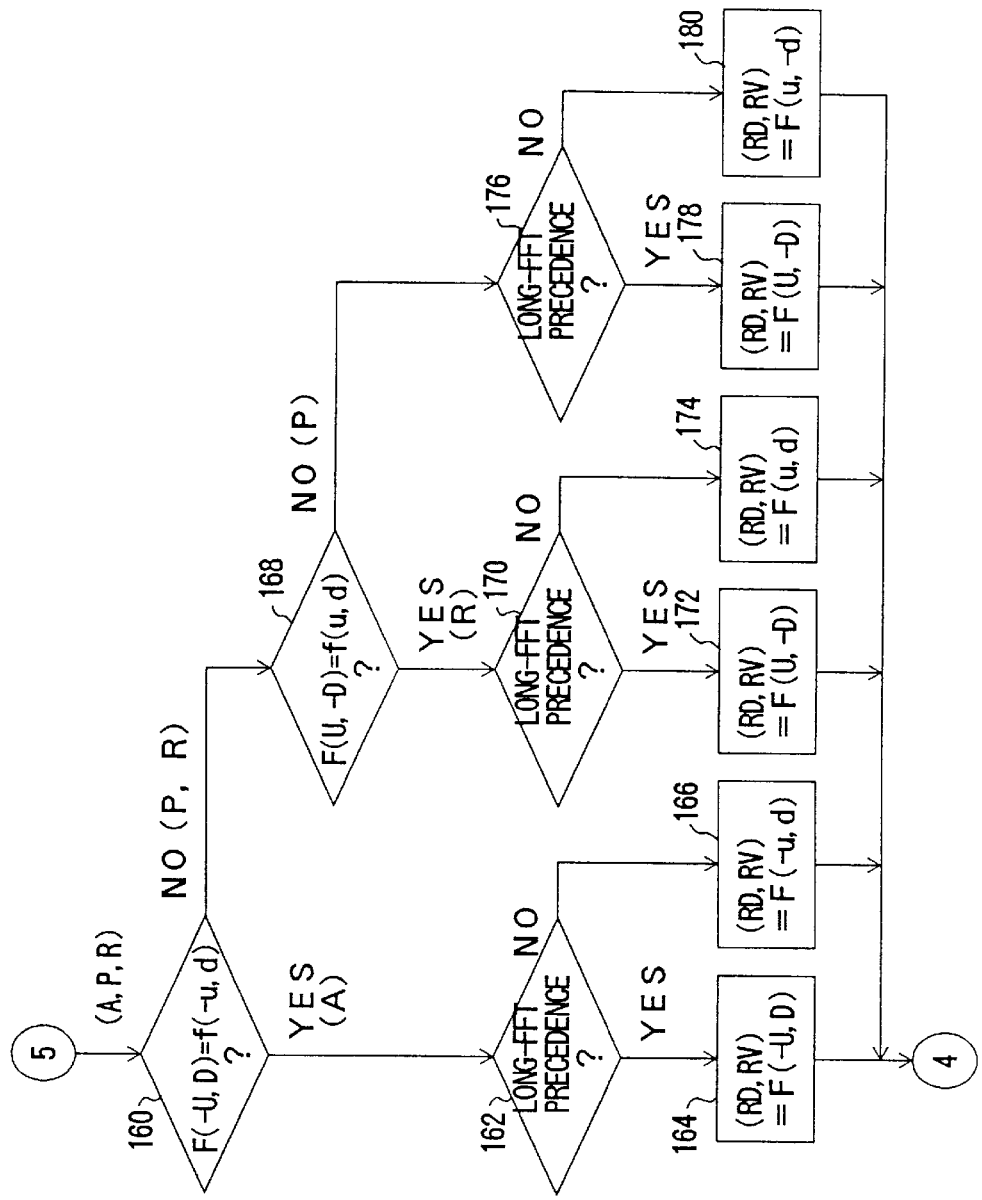
FIG. 11 is a fourth part of a flowchart of a routine performed by the radar system of the first embodiment.
Figure 16:
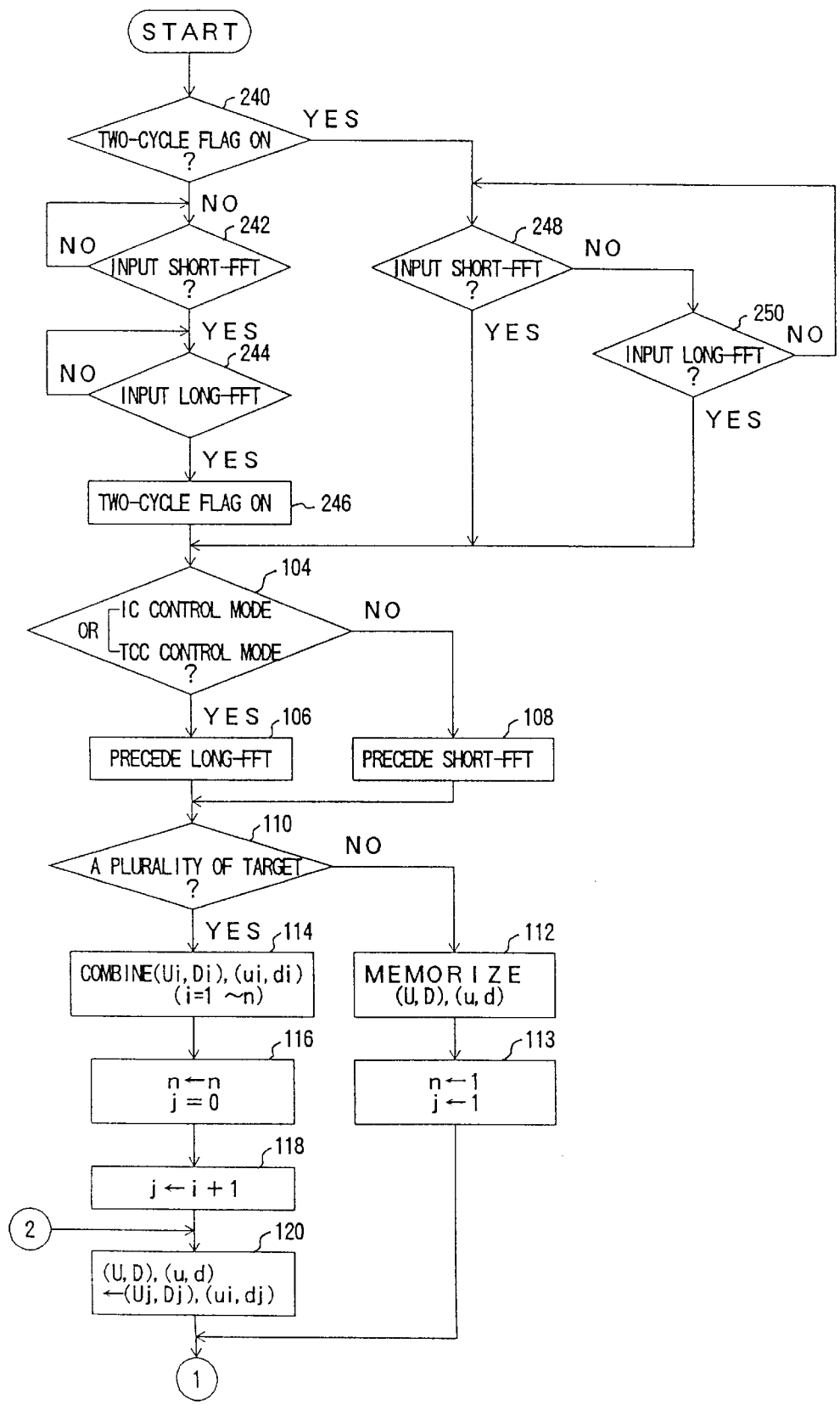
FIG. 16 is a flowchart of a routine performed by a radar system of a second embodiment of the present invention.

FIG. 16 shows a flowchart of a routine which the calculator 22 performs to provide the function discussed above. In the present embodiment, the calculator 22 performs the routine shown in FIG. 9 through FIG. 13 following the execution of the routine shown in FIG. 16. Incidentally, those steps shown in FIG. 8 are given the same reference numbers in FIG. 16 and the explanation thereof will be omitted. When the routine is started, procedure of step 240 is started first.

In step 240, it is determined whether a two-cycle flag is set to on. The two-cycle flag is reset to off by an initial procedure just after an ignition switch of the vehicle is turned on. Accordingly, it is determined that the two-cycle flag is not set to on when the procedure of the present step 240 is performed just after the turning on of the ignition switch. In this case, the routine proceeds to step 242.

In step 242, it is determined whether the Short-FFT result is input. The procedure of the present step 242 is repeatedly performed until it is determined that the Short-FFT result is input. When the determination is performed, the routine proceeds to step 244.

In step 244, it is determined whether the Long-FFT result is input. The procedure of the present step 244 is repeatedly performed until it is determined that the Long-FFT result is input. When the determination is performed, the routine proceeds to step 246.

In step 246, the two-cycle flag is set to on. When the procedure is performed it is always determined that the two-cycle flag is set to on in the above step 246 whenever the routine is started. When the procedure of the present step 246 is finished, the procedures below step 104 are performed in the same manner as the first embodiment.

The routine proceeds to step 248 next to the above step 240 whenever being started after the two-cycle flag is set to on.

In step 248, it is determined whether the Short-FFT is input. When it is determined that the Short-FFT is input, the routine performs the procedures below step 104. On the other hand, when it is determined that the Short-FFT is not input, the routine proceeds to step 250.

In step 250, it is determined whether the Long-FFT is input. When it is determined that the Long-FFT is input, the routine performs the procedures below step 104. On the other hand, when it is determined that the Long-FFT is not input, the routine proceeds to the above step 248 again.

FIG. 17 shows a time chart for explaining an operation timing of the radar system of the second embodiment. More particularly, FIG. 17A and FIG. 17B show timings when the FFT circuit 24 of the second embodiment detects the Short-FFT result and the Long-FFT result, respectively. FIG. 17C shows a timing when the calculator 22 of the second embodiment calculates the relative distance RD and the relative velocity RV.

According to the routine shown in FIG. 16, the procedures of below step 104, i.e., the procedures for calculating the RD and the RV are performed at first when a pair of Short-FFT result and the Long-FFT result is detected after the ignition switch is turned on. Further, the procedures of below step 104 are performed whenever either the Short-FFT result or the Long-FFT result is detected after the pair thereof is detected. Therefore, as shown in FIG. 17C, the radar system of the second embodiment calculates the relative distance RD and the relative velocity RV every 50 msec but just after the start of the radar system. Accordingly, the radar system detects the RD and the RV more frequently than the radar system of the first embodiment does.

Further, the present invention is not limited to these embodiments, but variations and modifications may be made without departing from the scope of the present invention.

What is claimed is:

1. An onboard radar system for a vehicle using the FM-CW method comprising:

a transmitter that transmits a transmitted wave toward a predetermined direction;

a modulator that repeatedly increases and decreases a modulated frequency of said transmitted wave with a predetermined repeated frequency;

a receiver that receives a reflected wave which is generated when said transmitted wave is reflected by a target;

a beat frequency generator that generates beat frequencies based on said reflected wave;

a beat frequency detector that detects an up beat frequency and a down beat frequency, which are generated during an up period where said modulated frequency increases and a down period where said modulated frequency decreases, respectively;

a transmitting mode changer that provides a first mode which is suitable to detect an up beat frequency and a down beat frequency having a correct sign when the target is distant from the vehicle and a second mode which is suitable to detect the up beat frequency and the down beat frequency having a correct sign when the target is nearby the vehicle by changing a state of said transmitted wave;

said beat frequency detector further comprising;

a Long-UP beat frequency detector that detects the up beat frequency detected in said first mode as a Long-UP beat frequency;

a Long-DOWN beat frequency detector that detects the down beat frequency detected in said first mode as a Long-DOWN beat frequency;

a Short-up beat frequency detector that detects the up beat frequency detected in said second mode as a Short-up beat frequency; and a Short-down beat frequency detector that detects the down beat frequency detected in said second mode as a Short-down beat frequency;

said radar system further comprising;

an analyzer that analyzes said Long-UP beat frequency, said Long-DOWN beat frequency, said Short-up beat frequency and said Short-down beat frequency;

a base beat frequency provider that provides a pair of base beat frequencies which are determined based on an analysis result of said analyzer; and a target detector that detects the target based on said pair of base beat frequencies.

2. The onboard radar system for a vehicle as claimed in claim 1, wherein said transmitting mode changer comprises a repeated frequency changer that changes the repeated frequency of a changing cycle of said modulated frequency.

3. The onboard radar system for a vehicle as claimed in claim 1, wherein said transmitting mode changer comprises a middle frequency changer that changes a middle frequency of said modulated frequency.

4. The onboard radar system for a vehicle as claimed in claim 1, wherein said transmitting mode changer comprises a changing width changer that changes a changing width of said modulated frequency.

5. The onboard radar system for a vehicle as claimed in claim 1, wherein said analyzer comprises a combination analyzer that analyzes said Long-UP beat frequency, said Long-DOWN beat frequency, said Short-up beat frequency and said Short-down beat frequency based on a combination of beat frequencies which are actually detected.

6. The onboard radar system for a vehicle as claimed in claim 1, wherein said analyzer comprises:

a first calculator that calculates a characteristic value of the target based on a pair of the Long-UP beat frequency and the Long-DOWN beat frequency;

a second calculator that calculates the characteristic value of the target based on a pair of the Short-up beat frequency and the Short-down beat frequency; and a comparative analyzer that analyzes said Long-UP beat frequency, said Long-DOWN beat frequency, said Short-up beat frequency and said Short-down beat frequency by comparing the characteristic values calculated by said first calculator and said second calculator.

7. The onboard radar system for a vehicle as claimed in claim 1, wherein said analyzer comprises a relative relationship analyzer that compares said up beat frequency and said down beat frequency.

8. The onboard radar system for a vehicle as claimed in claim 1, wherein said analyzer comprises a past data analyzer that performs an analysis based on past beat frequencies.

9. The onboard radar system for a vehicle as claimed in claim 1, wherein:

said analyzer determines whether beat frequencies actually detected are only said Short-up beat frequency and said Short-down beat frequency; and said base beat frequency provider provides said Short-up beat frequency and said Short-down beat frequency as said base beat frequencies without changing a sign thereof when the beat frequencies actually detected are only said Short-up beat frequency and said Short-down beat frequency.

10. The onboard radar system for a vehicle as claimed in claim 1, wherein:

said analyzer detects a combination of beat frequencies actually detected;

said target detector detects a relative distance and a relative velocity between the target and the vehicle;

said radar system further comprising a target estimating unit that estimates the relative distance and the relative velocity based on a past relative distance, a past relative velocity and a passing time after the detection of the past relative distance and the past relative velocity when neither a pair of said Long-UP beat frequency and said Long-DOWN beat frequency nor a pair of said Short-up beat frequency and said Short-down beat frequency are detected.

11. The onboard radar system for a vehicle as claimed in claim 1, wherein:

said analyzer detects a combination of beat frequencies actually detected;

said radar system further comprising:

a beat frequency estimating unit that estimates a non-detected beat frequency which is not actually detected when another beat frequency which makes up either a pair of said Long-UP beat frequency and said Long-DOWN beat frequency or a pair of said Short-up beat frequency and said Short-down beat frequency with said non-detected frequency is actually detected;

a difference detector that detects a frequency difference between a first past beat frequency in accordance with said non-detected beat frequency and a second past beat frequency in accordance with said another beat frequency;

said beat frequency estimating unit estimates said non-detected beat frequency based on said another beat frequency and said frequency difference; and said base beat frequency provider provides a pair of an estimated value of said non-detected beat frequency and said another beat frequency as said pair of base beat frequencies.

12. The onboard radar system for a vehicle as claimed in claim 1, wherein:

said analyzer detects a combination of beat frequencies actually detected; and said base beat frequency provider further comprises a vehicle condition detector that detects a vehicle condition; and a base beat frequency selector that select either the pair of said Long-UP beat frequency and said Long-DOWN beat frequency or the pair of said Short-up beat frequency and said Short-down beat frequency as said pair of base beat frequencies based on the vehicle condition, when both of the pair are actually detected.

13. The onboard radar system for a vehicle as claimed in claim 12, wherein:

said vehicle condition detector detects a first condition where it is required to correctly detect targets existing distant from the vehicle and a second condition where it is required to correctly detect targets existing nearby the vehicle; and said base beat frequency selector selects the pair of said Long-UP beat frequency and said Long-DOWN beat frequency as said pair of base beat frequencies when said first condition is detected while selecting the pair of said Short-up beat frequency and said Short-down beat frequency as said base beat frequency when said second condition is detected.

14. The onboard radar system for a vehicle as claimed in claim 1, wherein:

said analyzer detects a combination of beat frequencies actually detected;

said radar system further comprises a past data analyzer that determines which pair has been actually detected later either the pair of said Long-UP beat frequency and said Long-DOWN beat frequency or the pair of said Short-up beat frequency and said Short-down beat frequency, when one of the long side beat frequencies and one of the short side beat frequencies are actually detected; and a beat frequency estimating unit that estimates a non-detected beat frequency which is not actually detected and belongs to the pair which has been actually detected later; and said base beat frequency provider provides said non-detected beat frequency estimated by said beat frequency estimating unit and a beat frequency which is actually detected and belongs to the pair which has been actually detected later as said pair of base beat frequencies.

* * * * *